United States Patent
Yang et al.

(10) Patent No.: US 10,110,365 B2
(45) Date of Patent: Oct. 23, 2018

(54) METHOD AND APPARATUS FOR TRANSMITTING CONTROL INFORMATION IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/124,658

(22) PCT Filed: Mar. 25, 2015

(86) PCT No.: PCT/KR2015/002918
§ 371 (c)(1),
(2) Date: Sep. 8, 2016

(87) PCT Pub. No.: WO2015/147544
PCT Pub. Date: Oct. 1, 2015

(65) Prior Publication Data
US 2017/0019237 A1    Jan. 19, 2017

Related U.S. Application Data

(60) Provisional application No. 61/969,833, filed on Mar. 25, 2014, provisional application No. 61/977,608, filed on Apr. 9, 2014.

(51) Int. Cl.
*H04L 5/14* (2006.01)
*H04L 5/00* (2006.01)
(Continued)

(52) U.S. Cl.
CPC .............. *H04L 5/14* (2013.01); *H04L 1/1812* (2013.01); *H04L 5/001* (2013.01); *H04L 5/0055* (2013.01);
(Continued)

(58) Field of Classification Search
CPC ....................................................... H04L 5/14
See application file for complete search history.

(56) References Cited

U.S. PATENT DOCUMENTS

2009/0296609 A1    12/2009  Choi et al.
2011/0243066 A1*   10/2011  Nayeb Nazar .......... H04L 1/007
                                                              370/328
(Continued)

FOREIGN PATENT DOCUMENTS

EP        2600555          6/2013
KR    10-2014-0023400      2/2014
(Continued)

OTHER PUBLICATIONS

PCT International Application No. PCT/KR2015/002917, Written Opinion of the International Searching Authority dated Jun. 23, 2015, 15 pages.
(Continued)

*Primary Examiner* — Jeffrey M Rutkowski
*Assistant Examiner* — Chae S Lee
(74) *Attorney, Agent, or Firm* — Lee, Hong, Degerman, Kang & Waimey

(57) ABSTRACT

The present invention relates to a wireless communication system. Specifically, the present invention relates to a method for transmitting, by a terminal, control information in an FDD cell, and an apparatus therefor, the method comprising the steps of: receiving sub-frame reconfiguration information for a UL CC; receiving, on the FDD cell, a PDCCH including DCI; receiving, on the FDD cell, a (Continued)

PDSCH indicated by the PDCCH; and transmitting, in sub-frame n on the UL CC, HARQ-ACK information on the PDSCH, wherein the index of a PUCCH resource used in transmitting the HARQ-ACK information is determined by $n^{(1)}_{PUCCH}=n_{CCE}+N^{(1)}_{PUCCH}$ or $n^{(1)}_{PUCCH}=n_{CCE}+N^{(1)}_{PUCCH}+\text{offset}$.

4 Claims, 19 Drawing Sheets

(51) Int. Cl.
    *H04W 72/04* (2009.01)
    *H04L 1/18* (2006.01)
(52) U.S. Cl.
    CPC ..... *H04W 72/042* (2013.01); *H04W 72/0406* (2013.01); *H04W 72/0446* (2013.01)

(56) References Cited

U.S. PATENT DOCUMENTS

| | | | |
|---|---|---|---|
| 2012/0063373 A1 | 3/2012 | Chincholi et al. | |
| 2013/0083707 A1 | 4/2013 | Wang | |
| 2013/0301586 A1 | 11/2013 | Fan et al. | |
| 2014/0301290 A1* | 10/2014 | He | H04W 76/00 370/329 |
| 2015/0043394 A1 | 2/2015 | Lin et al. | |
| 2016/0255649 A1 | 9/2016 | Kusashima et al. | |
| 2016/0337110 A1 | 11/2016 | Yang et al. | |
| 2016/0374082 A1 | 12/2016 | Nguyen et al. | |

FOREIGN PATENT DOCUMENTS

| | | |
|---|---|---|
| WO | 2013138715 | 9/2013 |
| WO | 2013157844 | 10/2013 |

OTHER PUBLICATIONS

PCT International Application No. PCT/KR2015/002918, Written Opinion of the International Searching Authority dated Jun. 16, 2015, 18 pages.
ETRI, "Remaining Issues on HARQ timing for TDD-FDD CA," 3GPP TSG-RAN WG1 #76, R1-140215, Feb. 2014, 4 pages.
Samsung, "DL HARQ timing for TDD-FDD CA," 3GPP TSG-RAN WG1 #76, R1-140359, Feb. 2014, 5 pages.
Huawei, "Motivation of New SI proposal: Evolving LTE with Flexible Duplex for Traffic Adaptation," 3GPP TSG-RAN WG1 #63, RP-140062, Feb. 2014, 2 pages.
U.S. Appl. No. 15/124,314, Office Action dated Nov. 3, 2017, 14 pages.
U.S. Appl. No. 15/124,314, Final Office Action dated Jun. 4, 2018, 24 pages.

* cited by examiner

METHOD AND APPARATUS FOR TRANSMITTING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2015/002918, filed on Mar. 25, 2015, which claims the benefit of U.S. Provisional Application No. 61/969,833, filed on Mar. 25, 2014, and 61/977,608, filed on Apr. 9, 2014, the contents of which are all hereby incorporated by reference herein in their entirety.

TECHNICAL FIELD

The present invention relates to a wireless communication system and, more particularly, to a method for transmitting control information in a wireless communication system and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE OF THE INVENTION

Technical Task

An object of the present invention is to provide a method for transmitting/receiving control information in a wireless communication system and an apparatus for the same.

The technical problems solved by the present invention are not limited to the above technical problems and those skilled in the art may understand other technical problems from the following description.

Technical Solutions

In a first technical aspect of the present invention, provided herein is a method of transmitting control information through an FDD cell containing a UL (Uplink) CC (Component Carrier) and a DL (Downlink) CC by a user equipment in a wireless communication system, including: receiving subframe reconfiguration information for the UL CC; receiving a PDCCH (Physical Downlink Control Channel) containing DCI (Downlink Component Information) on the FDD cell; receiving a PDSCH (Physical Downlink Shared Channel) indicated by the PDCCH on the FDD cell; and transmitting HARQ-ACK (Hybrid Automatic Repeat reQuest Acknowledgement) information for the PDSCH in a subframe n on the UL CC, wherein an index of a PUCCH (Physical Uplink Control Channel) resource used for transmitting the HARQ-ACK information is determined as follows:

when the PDSCH is received in a subframe n−4 on the DL CC, the PUCCH resource index is given by $n^{(1)}_{PUCCH} = n_{CCE} + N^{(1)}_{PUCCH}$; and when the PDSCH is received either in a subframe other than the subframe (n−4) on the DL CC or on the UL CC, the PUCCH resource index is given by $n^{(1)}_{PUCCH} = n_{CCE} + N^{(1)}_{PUCCH} + \text{offset}$, where the $n_{CCE}$ corresponds to an index of a resource constituting the PDCCH, the $N^{(1)}_{PUCCH}$ is a constant configured by a higher layer, and the offset is a positive integer.

In a second technical aspect of the present invention, provided herein is a user equipment configured to transmit control information through an FDD cell containing a UL (Uplink) CC (Component Carrier) and a DL (Downlink) CC in a wireless communication system, including: an RF (Radio Frequency) unit; and a processor, wherein the processor is configured to receive subframe reconfiguration information for the UL CC, receive a PDCCH (Physical Downlink Control Channel) containing DCI (Downlink Component Information) on the FDD cell, receive a PDSCH (Physical Downlink Shared Channel) indicated by the PDCCH on the FDD cell, and transmit HARQ-ACK (Hybrid Automatic Repeat reQuest Acknowledgement) information for the PDSCH in a subframe n on the UL CC, and wherein an index of a PUCCH (Physical Uplink Control Channel) resource used for transmitting the HARQ-ACK information is determined as follows:

when the PDSCH is received in a subframe n−4 on the DL CC, the PUCCH resource index is given by $n^{(1)}_{PUCCH} = n_{CCE} + N^{(1)}_{PUCCH}$; and when the PDSCH is received either in a subframe other than the subframe (n−4) on the DL CC or on the UL CC, the PUCCH resource index is given by $n^{(1)}_{PUCCH} = n_{CCE} + N^{(1)}_{PUCCH} + \text{offset}$, where the $n_{CCE}$ corresponds to an index of a resource constituting the PDCCH, the $N^{(1)}_{PUCCH}$ is a constant configured by a higher layer, and the offset is a positive integer.

Preferably, the $n_{CCE}$ may represent an index of a first CCE (Control Channel Element) of a plurality of CCEs constituting the PDCCH.

Preferably, the offset may correspond to the total number of PUCCH resources linked to the subframe n−4 on the DL CC.

Preferably, the total number of the PUCCH resources may be determined based on a CFI (Control Format Indicator) value or the number of CCEs configured in the subframe n−4 on the DL CC.

Preferably, when the PDSCH is received in a subframe other than the subframe n−4 on the DL CC, a first offset may be applied and when the PDSCH is received on the UL CC, a second offset, which is different from the first offset, may be applied.

Advantageous Effects

According to the present invention, it is possible to efficiently transmit/receive control information in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE FOR INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

In a wireless communication system, a user equipment (UE) receives information from a base station (BS) on downlink (DL) and transmits information to the BS on uplink (UL). In LTE(-A), DL transmission is performed using OFDMA and uplink transmission is performed using single carrier frequency division multiple access (SC-FDMA).

Figure 1:
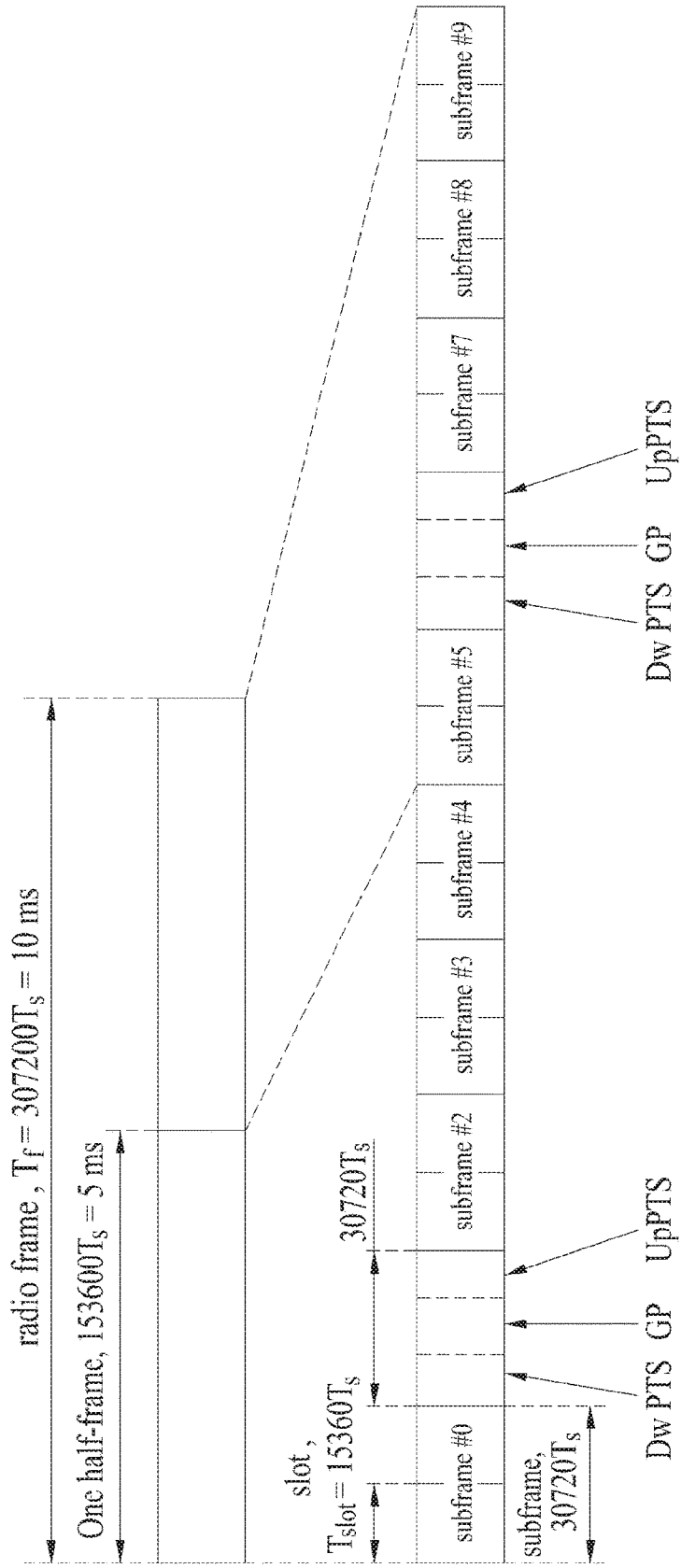
FIG. 1 illustrates a radio frame structure.

FIG. 1 illustrates a radio frame structure.

There are a type-1 radio frame structure for frequency division duplex (FDD) and a type-2 radio frame structure for time division duplex (TDD). A radio frame includes a plurality of (e.g. 10) subframes each of which includes a plurality of (e.g. 2) slots in the time domain. Each subframe has a duration of 1 ms and each slot has a duration of 0.5 ms. A slot includes a plurality of OFDM/SC-FDMA symbols in the time domain and includes a plurality of resource blocks (RBs) in the frequency domain.

FIG. 1 illustrates the type-2 radio frame structure for TDD. The type-2 radio frame includes 2 half frames. Each half frame includes 5 subframes each of which includes 2 slots.

Table 1 shows a UL-DL configuration (Uplink-Downlink Configuration, UL-DL Cfg or UD-cfg) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
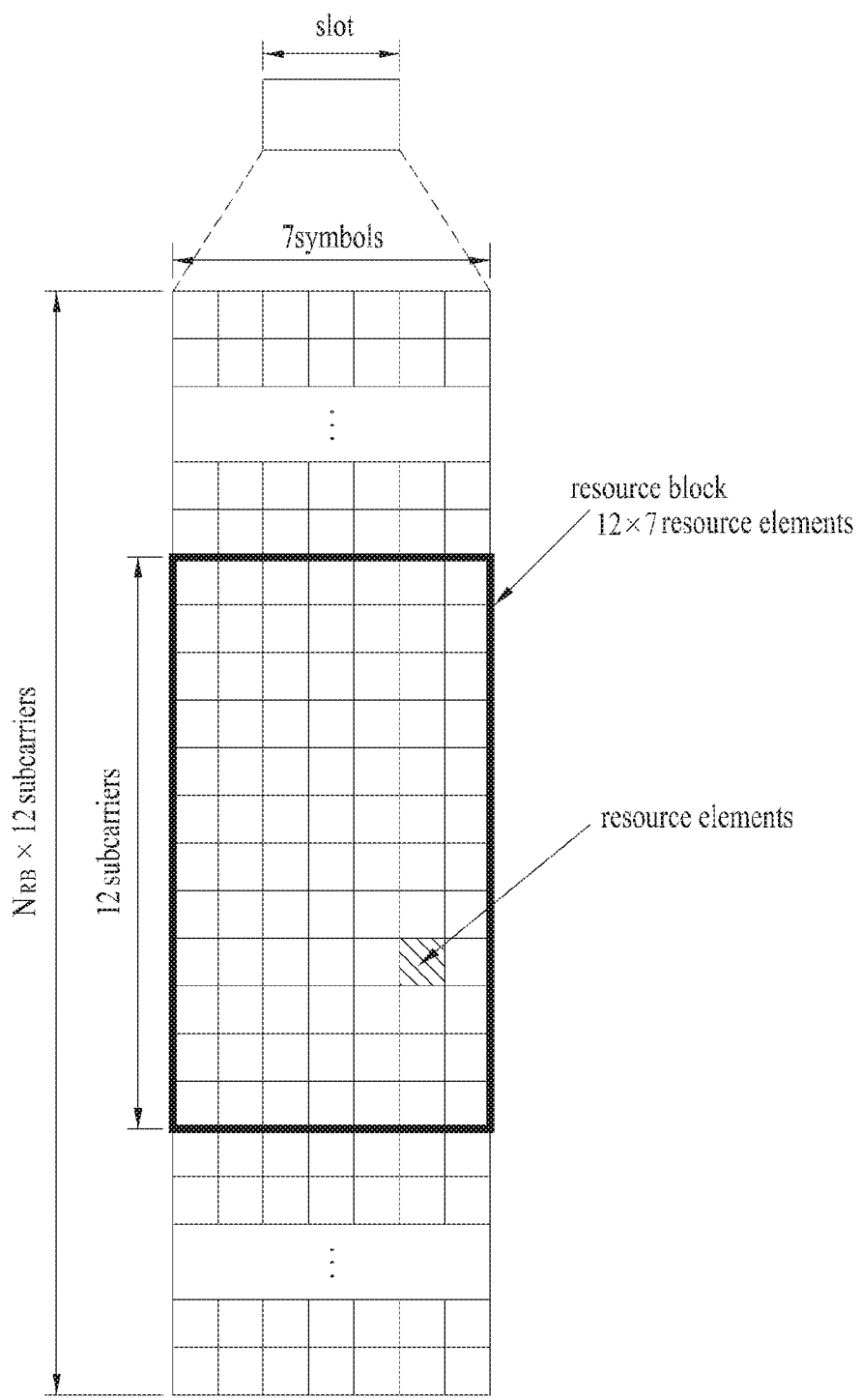
FIG. 2 illustrates a resource grid of a downlink slot.

FIG. 2 illustrates a resource grid of a DL slot.

Referring to FIG. 2, a DL slot includes a plurality of OFDMA (or OFDM) symbols in the time domain. One DL slot may include 7(6) OFDMA symbols according to cyclic prefix (CP) length, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of a UL slot may be same as that of the DL slot except that OFDMA symbols by replaced by SC-FDMA symbols.

Figure 3:
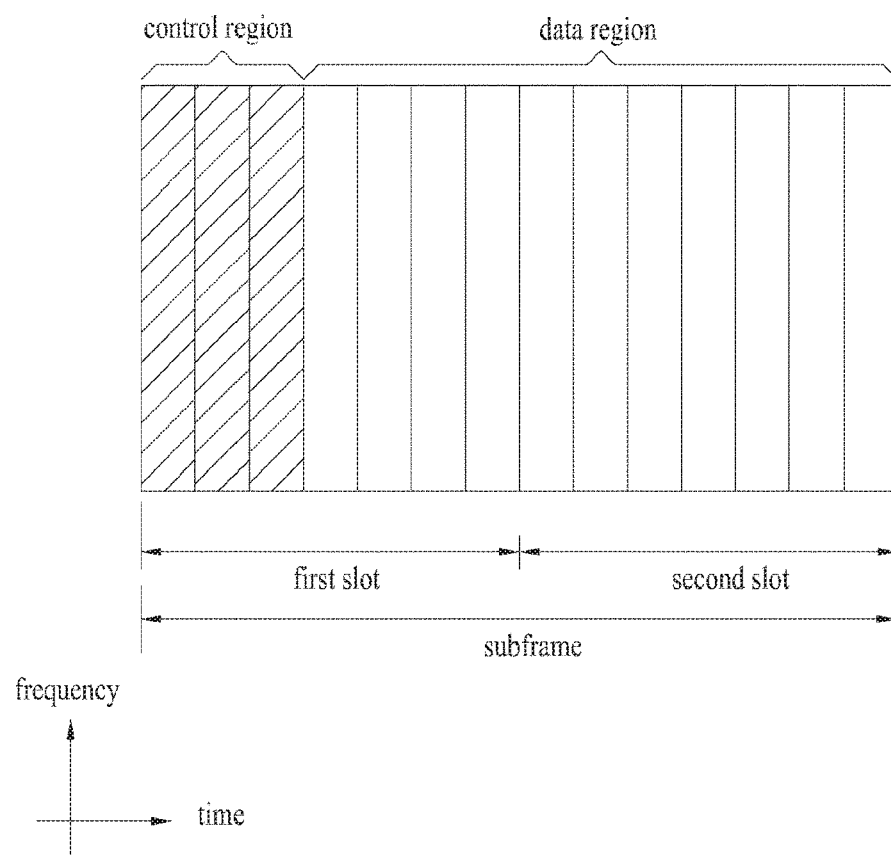
FIG. 3 illustrates a downlink subframe structure.

FIG. 3 illustrates a DL subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of DL control channels include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ-ACK signal.

A PDCCH may carry a transport format and a resource allocation of a downlink shared channel (DL-SCH), resource allocation information of an uplink shared channel (UL-SCH), paging information on a paging channel (PCH), system information on the DL-SCH, information on a resource allocation of an upper-layer control message such as a random access response transmitted on the PDSCH, a set of Tx power control commands on individual UEs within an arbitrary UE group, a Tx power control command, information on activation of a voice over IP (VoIP), etc. Downlink control information (DCI) is transmitted through the PDCCH. DCI formats 0/4 (referred to as UL DCI formats hereinafter) for UL scheduling (or UL grant (UG)) and DCI formats 1/1A/1B/1C/1D/2/2A/2B/2C/2D (referred to as DL DCI formats) DL scheduling are defined. The DCI formats selectively include information such as hopping flag, RB allocation, MCS (Modulation Coding Scheme), RV (Redundancy Version), NDI (New Data Indicator), TPC (Transmit Power Control), DMRS (Demodulation Reference Signal) cyclic shift, etc. as necessary.

A plurality of PDCCHs can be transmitted within a control region. A UE monitors the plurality of PDCCHs per subframe in order to check a PDCCH destined therefor. The PDCCH is transmitted through one or more control channel elements (CCEs). A PDCCH coding rate may be controlled by the number of CCEs (i.e. CCE aggregation level) used for PDCCH transmission. A CCE includes a plurality of resource element groups (REGs). A format of the PDCCH and the number of PDCCH bits are determined by the number of CCEs. A BS determines a PDCCH format according to DCI to be transmitted to the UE, and attaches a cyclic redundancy check (CRC) to control information. The CRC is masked with an identifier (e.g. a radio network temporary identifier (RNTI)) according to an owner or usage of the PDCCH. If the PDCCH is for a specific UE, then an identifier (e.g., cell-RNTI (C-RNTI)) of the UE may be masked to the CRC. If the PDCCH is for a paging message, then a paging identifier (e.g., paging-RNTI (P-RNTI)) may be masked to the CRC. If the PDCCH is for system information (more specifically, a system information block (SIB)), then a system information RNTI (SI-RNTI) may be masked to the CRC. When the PDCCH is for a random access response, then a random access-RNTI (RA-RNTI) may be masked to the CRC.

A PDCCH carries a message known as DCI. In general, a plurality of PDCCHs is transmitted in a subframe. Each PDCCH is transmitted using one or more CCEs. Here, one CCE corresponds to 9 REGs and one REG corresponds to 4 REs. Four QPSK symbols are mapped to each REG. The REs occupied by a reference signal do not belong to the REG, and thus the number of REGs within a given OFDM symbol varies according to whether a cell-specific reference signal is present. The concept of REG can be applied to other downlink control channels (i.e., PCFICH and PHICH). Four PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The CCEs are sequentially numbered and consecutively used. To simplify a decoding process, a PDCCH having a format composed of n CCEs may start only at a CCE having a number corresponding to a multiple of n. The number of CCEs used to transmit a specific PDCCH is determined by a BS according to a channel state. For instance, in case of a PDCCH for a UE having a good DL channel (e.g., a UE adjacent to a BS), one CCE may be sufficient. However, in case of a PDCCH for a UE having a poor channel (e.g., a UE located at a cell boundary), 8 CCEs may be used to obtain sufficient robustness. In addition, a power level of the PDCCH may be adjusted based on the channel state.

In the LTE system, a CCE set in which a PDCCH can be located is defined for each UE. A CCE set in which the UE can detect its PDCCH is referred to as a PDCCH search space or simply as a search space (SS). An individual resource on which a PDCCH can be transmitted in the SS is referred to as a PDCCH candidate. One PDCCH candidate may correspond to 1, 2, 4, or 8 CCEs depending on the CCE aggregation level. The BS transmits an actual PDCCH (DCI) on a random PDCCH candidate in the SS and the UE monitors the SS to detect the PDCCH (DCI). Particularly, the UE attempts to perform blind decoding (BD) on PDCCH candidates in the SS.

In the LTE system, SSs for respective PDCCH formats may have different sizes. In particular, a dedicated SS (or, UE-specific SS (USS)) and a common SS (CSS) are defined. The USS is configured for each individual UE and information on a CSS range is provided to all UEs. At a given UE, the USS and CSS may overlap each other.

Since the SSs have relatively small sizes and they may overlap each other, the BS may be unable to find a CCE resource for transmitting the PDCCH to all of the preferred UEs in a given subframe. This is because, if the CCE resource is allocated for another UE, there may be no CCE resource for a specific UE in an SS of the corresponding UE (blocking). To minimize the possibility that the blocking is maintained until a next subframe, a UE-specific hopping sequence is applied to a starting point of the dedicated SS. Table 3 shows sizes of the USS and CSS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

Figure 4:
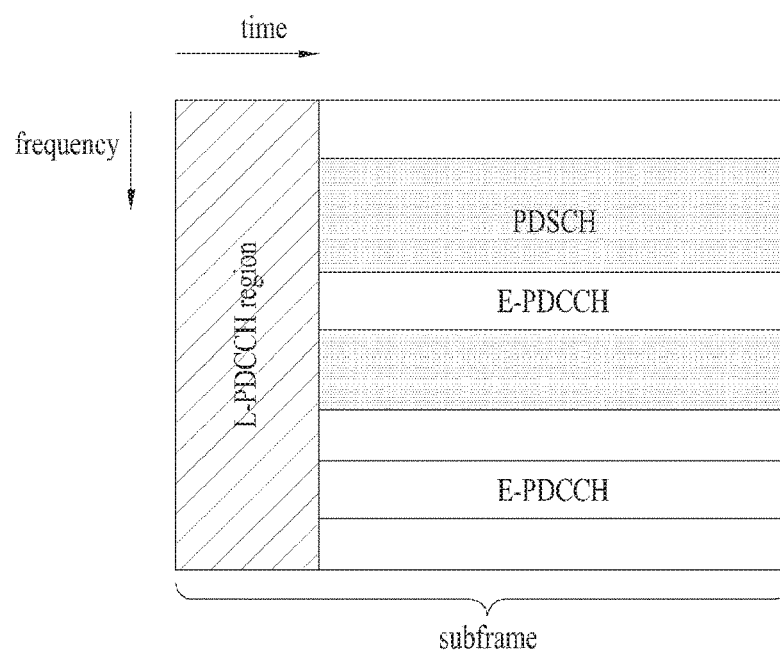
FIG. 4 illustrates an example of Enhanced Physical Downlink Control Channel (EPDCCH)

FIG. 4 illustrates an EPDCCH. The EPDCCH is a channel additionally introduced in LTE-A.

Referring to FIG. 4, a PDCCH (for convenience, legacy PDCCH or L-PDCCH) according to legacy LTE/LTE-A may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similar to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. Unless otherwise specified, the PDCCH in the present specification includes both of the L-PDCCH and EPDCCH.

Figure 5:
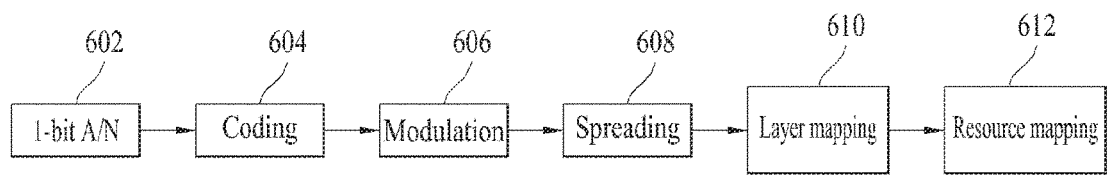
FIG. 5 illustrates a PHICH (Physical Hybrid ARQ Indicator Channel) signal processing process/block.

FIG. 5 illustrates a PHICH signal processing process/block.

Referring to FIG. 5, an A/N generation block 602 generates one piece of 1-bit A/N as a response to a PUSCH in case of MU-MIMO (multi-user multiple input multiple output) and generates two pieces of 1-bit A/N as a response to a PUSCH in case of SU-MIMO (single-user MIMO). Subsequently, (channel) coding 604 (e.g., ⅓ repetition coding), modulation 606 (e.g., BPSK (binary phase shift keying)), spreading 608, layer mapping 610, and resource mapping 612 are applied to the A/N bit for PHICH generation.

A plurality of PHICHs may be mapped to the same RE (e.g. REG) and then form a PHICH group. The REG is composed of four neighboring REs among the remaining REs except REs for a reference signal on one OFDM symbol. Each PHICH is identified by an orthogonal sequence (used in spreading) in the PHICH group. Accordingly, a PHICH resource is identified by an index pair ($n_{PHICH}^{group}$, $n_{PHICH}^{seq}$). Here, $n_{PHICH}^{group}$ represents a PHICH group number and $n_{PHICH}^{seq}$ represents an orthogonal sequence index. $n_{PHICH}^{group}$ and $n_{PHICH}^{seq}$ are checked using the lowest physical RB (PRB) index from among PRB indices allocated for PUSCH transmission and a cyclic shift of a DMRS transmitted through a UG.

Equation 1 represents an example of calculating $n_{PHICH}^{group}$ and $n_{PHICH}^{seq}$.

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH}$$

[Equation 1]

In Equation 1, $n_{DMRS}$ is mapped from a DMRS field value (i.e. cyclic shift) in a UG PDCCH signal which is most recently received in response to PUSCH transmission. $n_{SF}^{PHICH}$ represents the size of a spreading factor used for PHICH modulation. $N_{SF}^{PHICH}$ is 4 in case of normal CP and 2 in case of extended CP. $N_{PHICH}^{group}$ represents the number of PHICH groups. In the case of the first TB of the PUSCH, $I_{PRB\_RA}$ is $I_{PRB\_RA}^{lowest\_index}$. In the case of the second TB of the PUSCH, $I_{PRB\_RA}$ is $I_{PRB\_RA}^{lowest\_index}+1$. $I_{PRB\_RA}^{lowest\_index}$ denotes the lowest PRB index (of the first slot) in PUSCH transmission. For PUSCH transmission in a subframe n (where, n=4 or 9) in TDD UL-DL configuration #0, $I_{PHICH}$ is set to 1. In other case, it is set to 0.

In the case of FDD (frame structure type 1), the number of PHICH groups, $N_{PHICH}^{group}$, is identical in all subframes. In addition, $N_{PHICH}^{group}$ in each subframe is given by Equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$

[Equation 2]

In Equation 2, $N_g \in \{⅙, ½, 1, 2\}$ is provided by a higher layer and $N^{DL}_{RB}$ represents the number of RBs of a DL band.

In the case of TDD (frame structure type 2), the number of PHICH groups may be changed in each DL subframe and is given by $m_i \cdot N_{PHICH}^{group}$. Table 4 shows $m_i$. For convenience, a PHICH resource (or the amount of PHICH resources) in case of $m_i=1$ is referred to as 1×PHICH resource and a PHICH resource (or the amount of PHICH resources) in case of $m_i=2$ is referred to as 2×PHICH resource.

TABLE 4

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Table 5 shows orthogonal sequences used in A/N bit spreading.

TABLE 5

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 6:
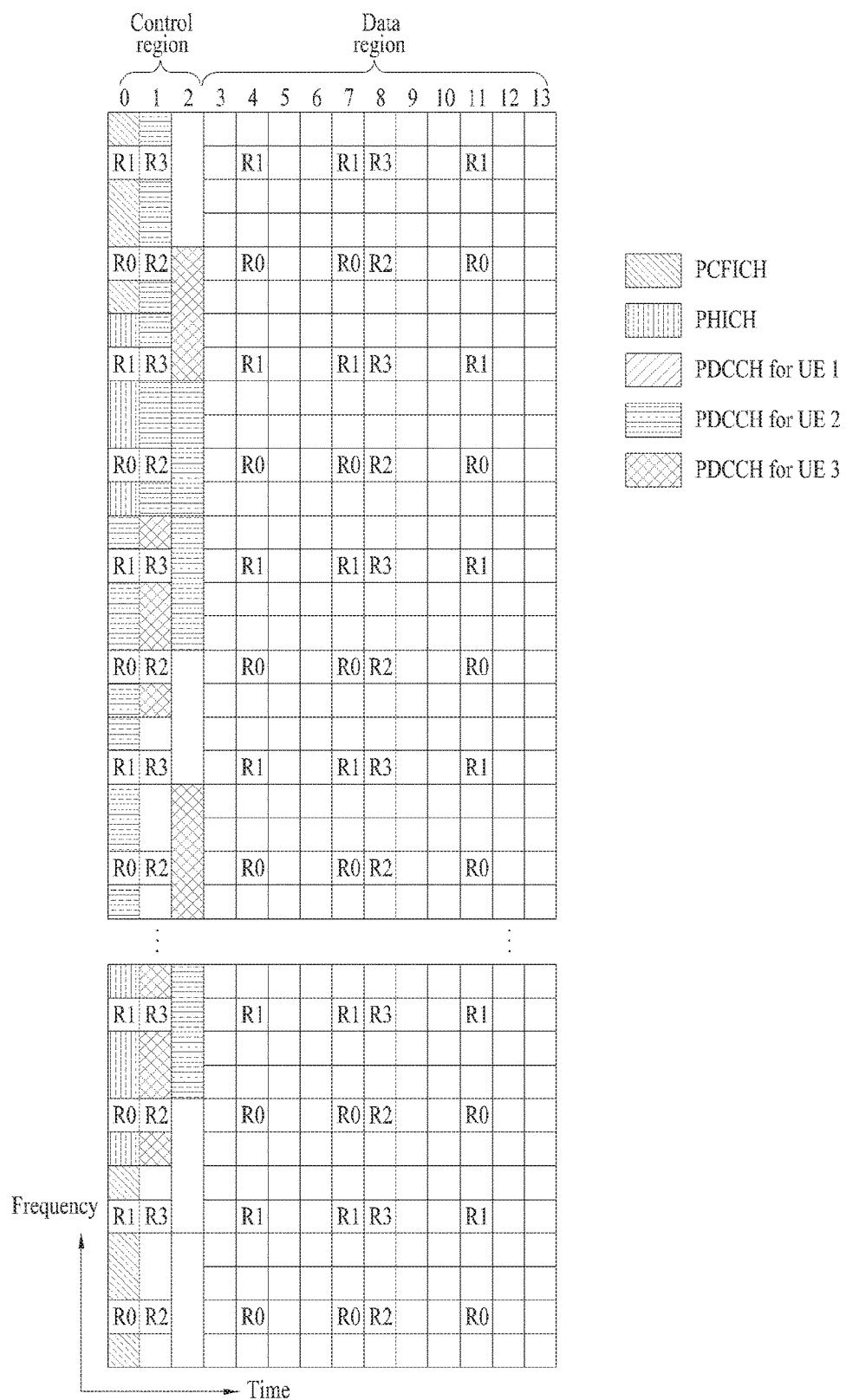
FIG. 6 illustrates a structure of a downlink physical channel.

FIG. 6 illustrates a structure of a downlink physical channel. In the drawing, R1 to R4 indicates CRSs (cell-specific reference signals) for antennas 0 to 3. Referring to FIG. 6, a control region includes a PCFICH, PHICH, and PDCCH. The basic resource of the downlink physical channel is an REG (resource element group). The REG is composed of four neighboring REs except an RS in an OFDMA symbol. The downlink physical channel is mapped to in an order of PCFICH>PHICH>PDCCH. That is, the PHICH is mapped to the rest of the REG except the PCFICH, and then the PDCCH is mapped to the remaining REG except the PCFICH/PHICH. Since PDCCH resources are changed according to PHICH resource, a UE should be aware of PHICH resource allocation information for PHCCH detection.

Figure 7:
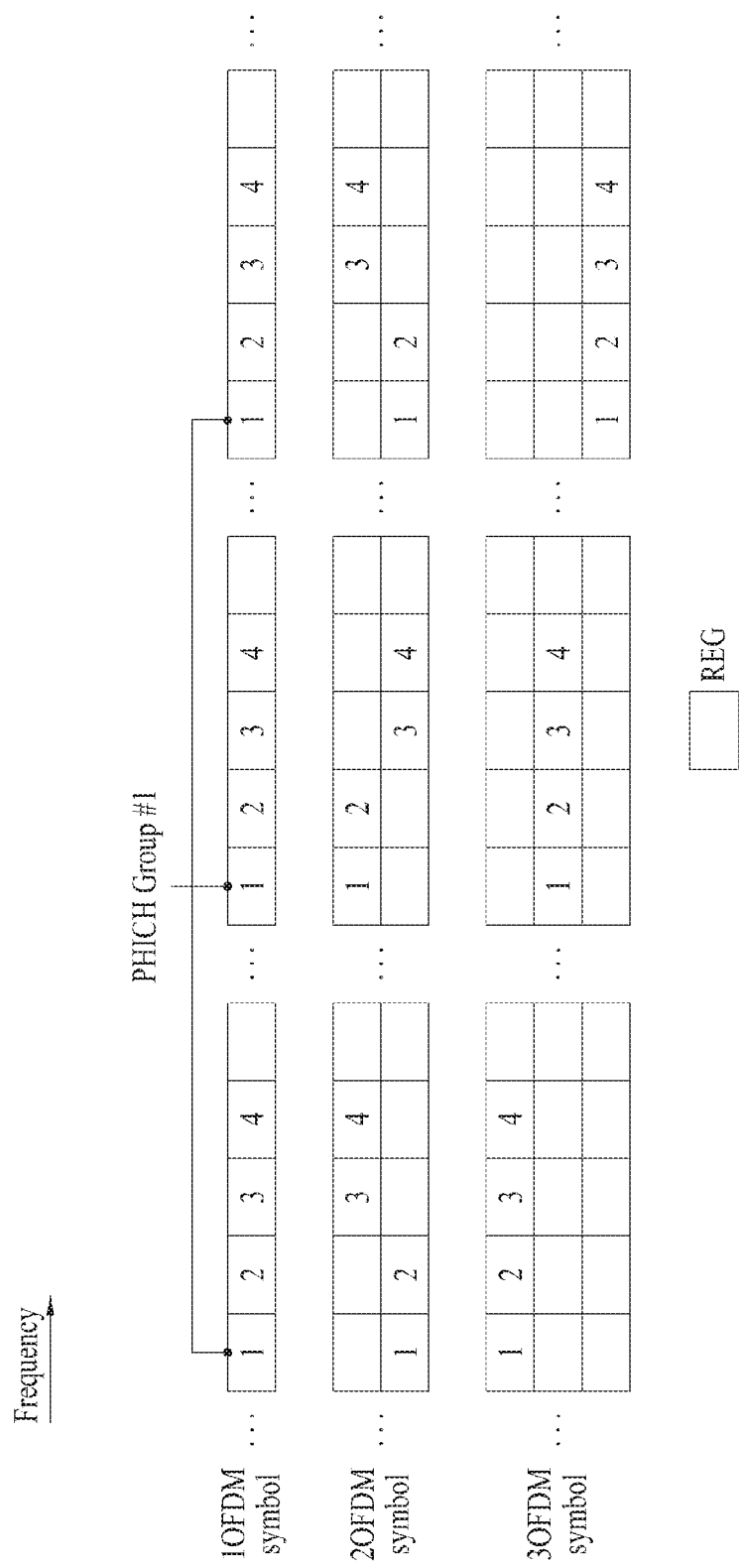
FIG. 7 illustrates an example of a PHICH group.

FIG. 7 illustrates an example of a PHICH group. Referring to FIG. 7, a PHICH group is transmitted using 3 REGs spaced as far apart as possible in the frequency domain. Consequently, each bit of an A/N codeword is transmitted through each REG. PHICH groups are consecutively allocated in the frequency domain. In the drawing, the same numeral denotes REGs belonging to the same PHICH group. A PHICH interval is limited by the size of the control region, and the number of OFDM symbols (PHICH interval) used for PHICH transmission corresponds to one to three OFDMA symbols. When a plurality of OFDMA symbols is used for the PHICH transmission, REGs belonging to the same PHICH group are transmitted using different OFDMA symbols.

Figure 8:
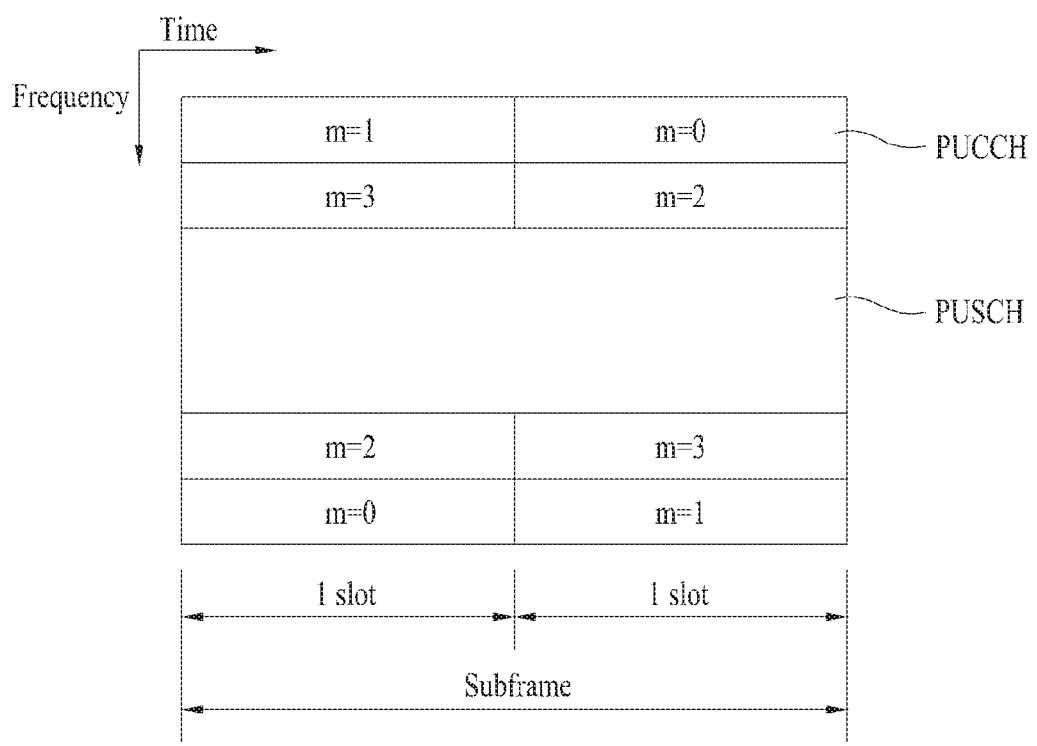
FIG. 8 illustrates the structure of an uplink subframe.

FIG. 8 illustrates a UL subframe structure.

Referring to FIG. 8, a UL subframe includes a plurality of (e.g. 2) slots. A slot may include different numbers of SC-FDMA symbols according to CP lengths. The UL subframe is divided into a control region and a data region in the frequency domain. The data region is used to carry a data signal such as audio data through a physical uplink shared channel (PUSCH). The control region is used to carry uplink control information (UCI) through a physical uplink control channel (PUCCH). The PUCCH includes an RB pair located at both ends of the data region in the frequency domain and hopped in a slot boundary.

The PUCCH can be used to transmit the following control information.

SR (scheduling request): This is information used to request a UL-SCH resource and is transmitted using On-Off Keying (OOK) scheme.

HARQ-ACK: This is an acknowledgement signal for a DL signal (e.g. a PDSCH or SPS release PDCCH). For example, a 1-bit ACK/NACK signal is transmitted as a response to a single DL codeword and a 2-bit ACK/NACK signal is transmitted as a response to two DL codewords.

CSI (channel state information): This is feedback information about a DL channel. The CSI includes a CQI (channel quality indicator), RI (rank indicator), PMI (precoding matrix indicator), PTI (precoding type indicator), etc.

Table 6 shows the mapping relationship between PUCCH formats and UCI in LTE(-A).

TABLE 6

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |

TABLE 6-continued

| PUCCH format | UCI (Uplink Control Information) |
|---|---|
| Format 1b | 2-bit HARQ ACK/NACK (SR exist/non-exist) |
| Format 2 | CSI (20 coded bits) |
| Format 2 | CSI and 1- or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Figure 9:
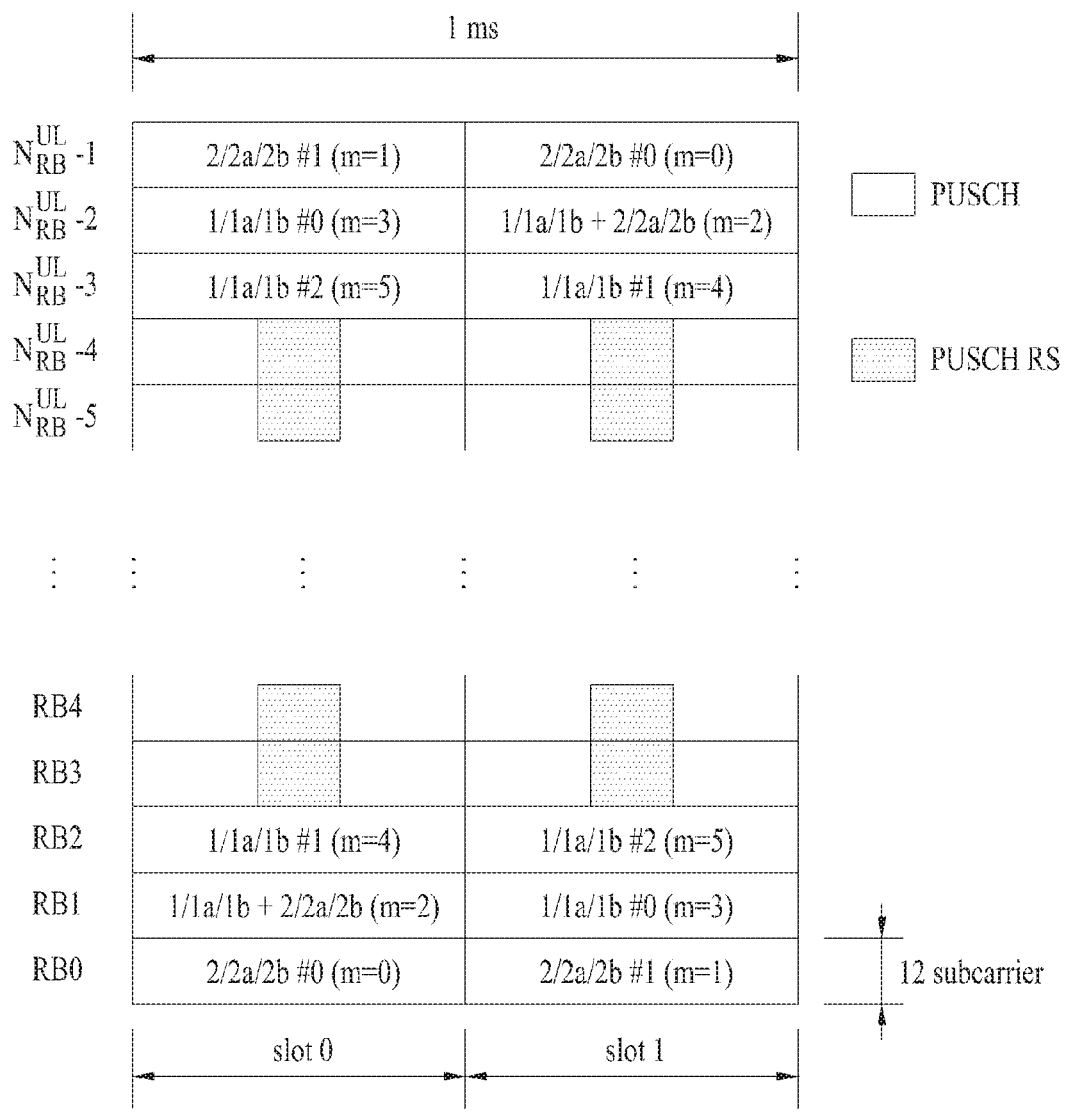
FIG. 9 illustrates an example of physically mapping a PUCCH format to a PUCCH region.

FIG. 9 illustrates an example of physically mapping PUCCH formats to PUCCH regions.

Referring to FIG. 9, the PUCCH formats are mapped to RBs in the order of PUCCH formats 2/2a/2b (CQI) (e.g. PUCCH region m=0, 1), PUCCH formats 2/2a/2b (CQI) or PUCCH formats 1/1a/1b (SR/HARQ ACK/NACK) (e.g. PUCCH region m=2 if present) and PUCCH formats 1/1a/1b (SR/HARQ ACK/NAKC) (e.g. PUCCH region m=3, 4, 5) from the band edge to the inside and transmitted. The number $N_{RB}^{(2)}$ of PUCCH RBs that can be used for PUCCH format 2/2a/2b (CQI) is signaled to the UE through broadcast signaling in the cell.

Figure 10:
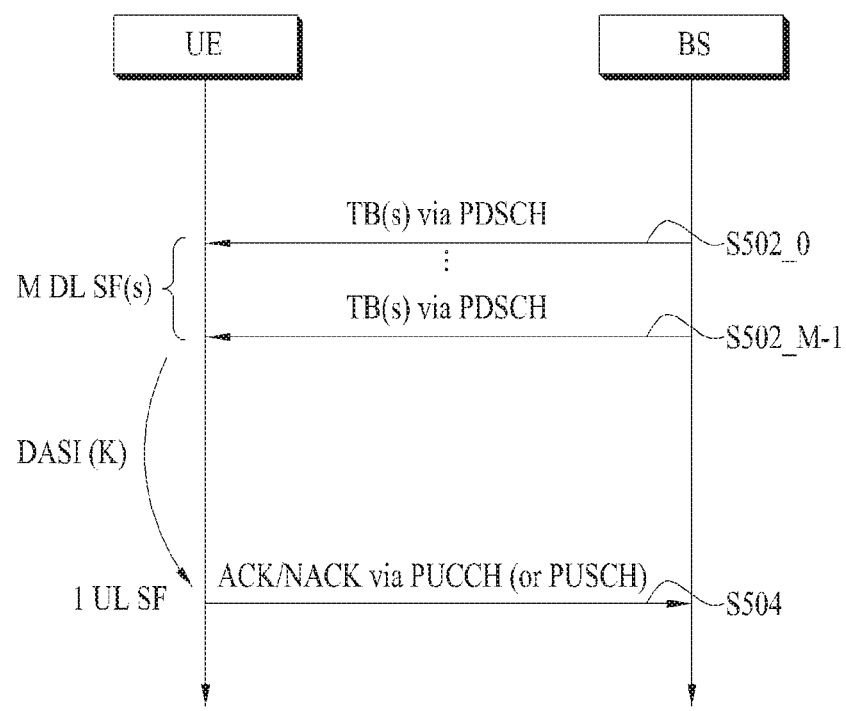
FIGS. 10 and 11 illustrate an ACK/NACK (A/N) timing (or an HARQ timing)
Figure 11:
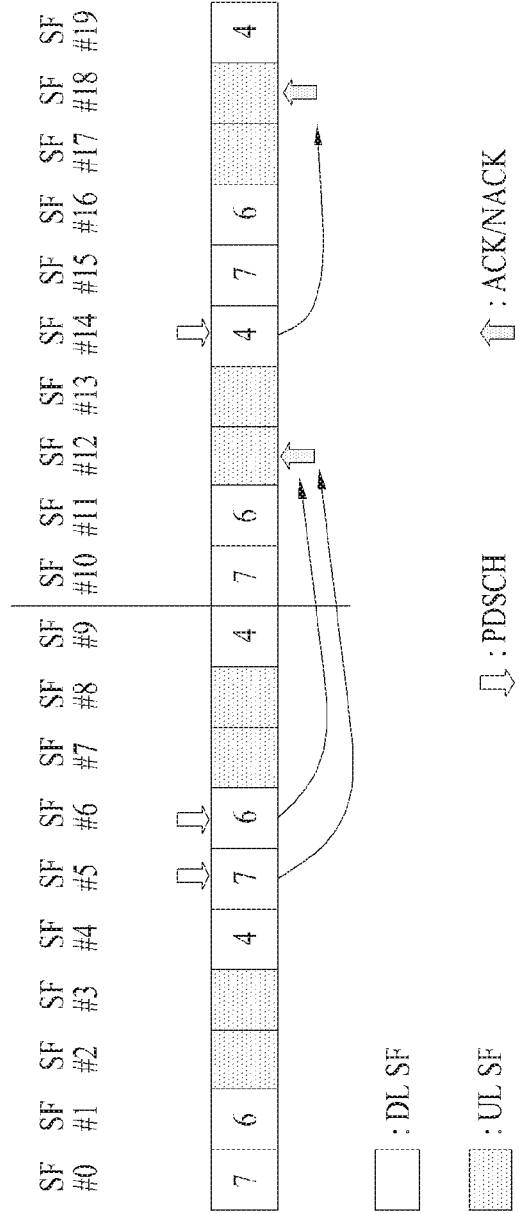

FIGS. 10 and 11 illustrate an ACK/NACK (A/N) timing (or an HARQ timing).

Referring to FIG. 10, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 4 can be used for ACK/NACK transmission. To reduce the number of ACK/NACK bits transmitted through a PUCCH format, various methods such as ACK/NACK bundling and ACK/NACK channel selection can be used.

In the FDD, M=1 and in the TDD, M is an integer greater than 1. In the case of the TDD, a relationship between M of DL subframes and UL subframes in which the A/N signal is transmitted is determined by DASI (downlink association set index).

Table 7 shows DASI (K:{$k_0, k_1, \ldots k_{M-1}$}) defined in LTE(-A). When a PDCCH that indicates PDSCH transmission and/or SPS (semi-persistent scheduling) release is present in a subframe n−k (where k∈K), a UE transmits ACK/NACK in a subframe n. In the FDD, DASI (for convenience, referred to as $d_F$) is set to 4.

TABLE 7

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD operation, a UE needs to transmit A/N signals for at least one DL transmission (e.g., PDSCH), which is received through M DL SFs, through one UL SF. A description will be given of schemes for transmitting A/N for a plurality of DL SFs through one UL SF.

1) A/N bundling: A/N bits for a plurality of data units (e.g. PDSCH, SPS release PDCCH, etc.) are combined through a logical operation (e.g. logic-AND operation). For example, when successfully decoding all data units, a receiving end (e.g. UE) transmits an ACK signal. On the contrary, when failing to decode any one of the data units, the receiving end transmits a NACK signal or no signal.

2) Channel selection (CHsel): When receiving a plurality of data units (e.g. PDSCH, SPS release PDCCH, etc.), a UE occupies a plurality of PUCCH resources for A/N transmission. A/N responses to the plurality of the data units are identified by combinations of the PUCCH resources used for the A/N transmission and transmitted A/N contents (e.g. bit values and QPSK symbol values). The channel selection is also referred to as A/N selection and PUCCH selection.

Table 8 shows a PUCCH selection transmission scheme defined in the LTE system (where M=4).

TABLE 8

| HARQ-ACK(0), HARQ-ACK(1), HARQ-ACK(2), HARQ-ACK(3) | Subframe | |
|---|---|---|
| | $n^{(1)}_{PUCCH, X}$ | b(0), b(1) |
| ACK, ACK, ACK, ACK | $n^{(1)}_{PUCCH, 1}$ | 1, 1 |
| ACK, ACK, ACK, NACK/DTX | $n^{(1)}_{PUCCH, 1}$ | 1, 0 |
| NACK/DTX, NACK/DTX, NACK, DTX | $n^{(1)}_{PUCCH, 2}$ | 1, 1 |
| ACK, ACK, NACK/DTX, ACK | $n^{(1)}_{PUCCH, 1}$ | 1, 0 |
| NACK, DTX, DTX, DTX | $n^{(1)}_{PUCCH, 0}$ | 1, 0 |
| ACK, ACK, NACK/DTX, NACK/DTX | $n^{(1)}_{PUCCH, 1}$ | 1, 0 |
| ACK, NACK/DTX, ACK, ACK | $n^{(1)}_{PUCCH, 3}$ | 0, 1 |
| NACK/DTX, NACK/DTX, NACK/DTX, NACK | $n^{(1)}_{PUCCH, 3}$ | 1, 1 |
| ACK, NACK/DTX, ACK, NACK/DTX | $n^{(1)}_{PUCCH, 2}$ | 0, 1 |
| ACK, NACK/DTX, NACK/DTX, ACK | $n^{(1)}_{PUCCH, 0}$ | 0, 1 |
| ACK, NACK/DTX, NACK/DTX, NACK/DTX | $n^{(1)}_{PUCCH, 0}$ | 1, 1 |
| NACK/DTX, ACK, ACK, ACK | $n^{(1)}_{PUCCH, 3}$ | 0, 1 |
| NACK/DTX, NACK, DTX, DTX | $n^{(1)}_{PUCCH, 1}$ | 0, 0 |
| NACK/DTX, ACK, ACK, NACK/DTX | $n^{(1)}_{PUCCH, 2}$ | 1, 0 |
| NACK/DTX, ACK, NACK/DTX, ACK | $n^{(1)}_{PUCCH, 3}$ | 1, 0 |
| NACK/DTX, ACK, NACK/DTX, NACK/DTX | $n^{(1)}_{PUCCH, 1}$ | 0, 1 |
| NACK/DTX, NACK/DTX, ACK, ACK | $n^{(1)}_{PUCCH, 3}$ | 0, 1 |
| NACK/DTX, NACK/DTX, ACK, NACK/DTX | $n^{(1)}_{PUCCH, 2}$ | 0, 0 |
| NACK/DTX, NACK/DTX, NACK/DTX, ACK | $n^{(1)}_{PUCCH, 3}$ | 0, 0 |
| DTX, DTX, DTX, DTX | N/A | N/A |

In Table 3, HARQ-ACK(i) indicates an HARQ ACK/NACK/DTX result for an i-th data unit (where, 0≤i≤3). The HARQ ACK/NACK/DTX result means ACK, NACK, DTX (discontinuous transmission) or NACK/DTX. The DTX means that there is no transmission of a data unit corresponding to HARQ-ACK(i) or a UE fails to detect presence of the data unit corresponding to HARQ-ACK(i). Maximum four PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 8, $n^{(1)}_{PUCCH,X}$ indicates a PUCCH resource used in ACK/NACK transmission. In addition, b(0)b(1) indicates two bits carried by the selected PUCCH resource and is modulated according to a QPSK scheme. For instance, when a UE decodes four data units successfully, the UE transmits (1, 1) to a BS through the PUCCH resource associated with $n^{(1)}_{PUCCH,1}$. Since combinations of PUCCH resources and QPSK symbols cannot represent all of available ACK/NACK, NACK and DTX are coupled to each other except in some cases (NACK/DTX, N/D).

FIG. 11 illustrates an A/N timing applied to a CC according to UL-DL configuration #1. In FIG. 11, SFs #0 to #9, and SFs #10 to #19 correspond to radio frames. The numeral in a box denotes a UL subframe associated with a DL subframe in terms of the DL subframe. For example, ACK/NACK for a PDSCH of SF #5 is transmitted in SF #5+7 (=SF #12), and ACK/NACK for a PDSCH of SF #6 is transmitted in SF #6+6 (=SF #12). That is, ACK/NACK for SF #5/SF #6 is transmitted in SF #12. Similarly, ACK/NACK for a PDSCH of SF #14 is transmitted in SF #14+4 (=SF #18).

Figure 12:
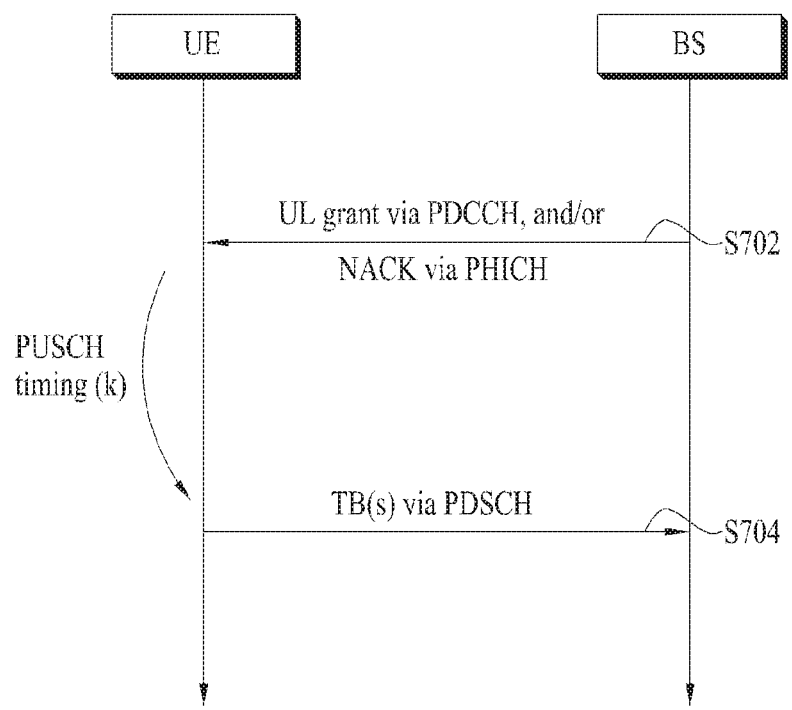
FIGS. 12 and 13 illustrate a PHICH/UG-PUSCH (UL grant Physical Uplink Shared Channel) timing.
Figure 13:
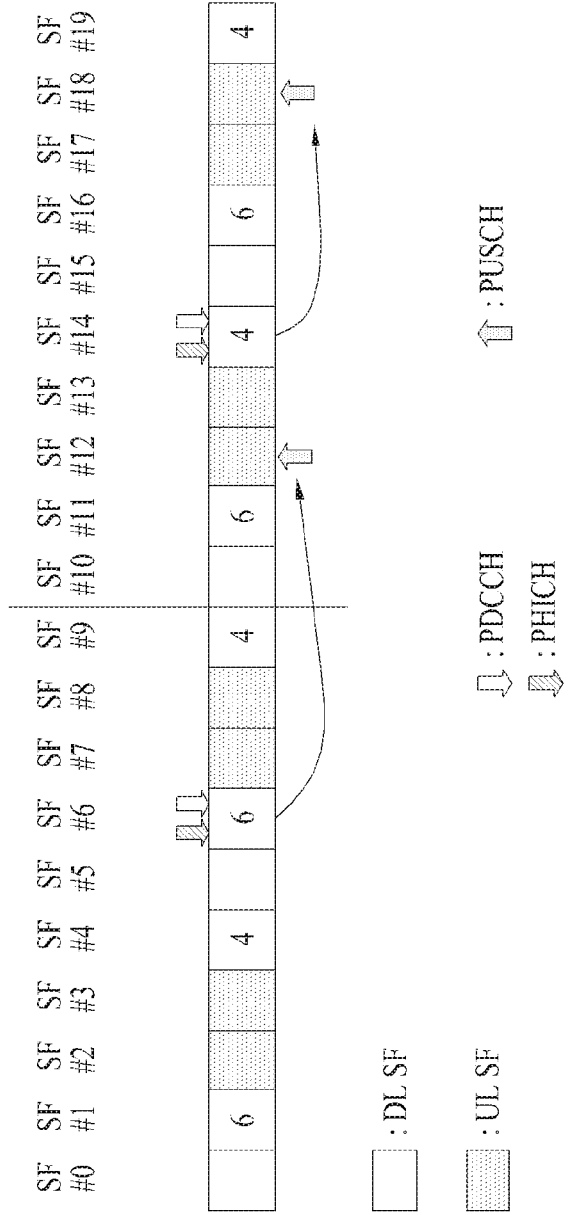

FIGS. 12 and 13 illustrate PHICH/UL grant (UG)-PUSCH timing. A PUSCH can be transmitted corresponding to a PDCCH (UL grant) and/or a PHICH (NACK).

Referring to FIG. 12, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 9 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k. In the FDD, UAI (referred to as k) is set to 4.

TABLE 9

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 13 illustrates PUSCH transmission timing when UL-DL configuration #1 is configured. In the figure, SF#0 to #9 and SF#10 to #19 respectively correspond to radio frames, and numerals in blocks denote UL subframes relating to DL subframes. For example, a PUSCH corresponding to PHICH/UL grant of SF#6 is transmitted in SF#6+6 (=SF#12) and a PUSCH corresponding to a PHICH/UL grant of SF#14 is transmitted in SF#14+4 (=SF#18).

Figure 14:
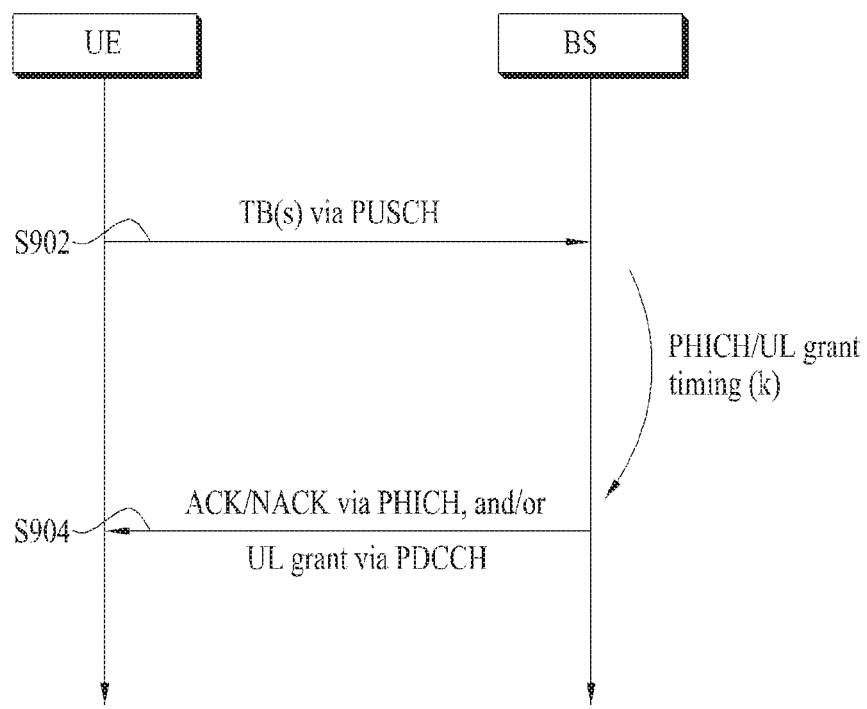
FIGS. 14 and 15 illustrate a UG (UL grant)/PHICH timing.
Figure 15:
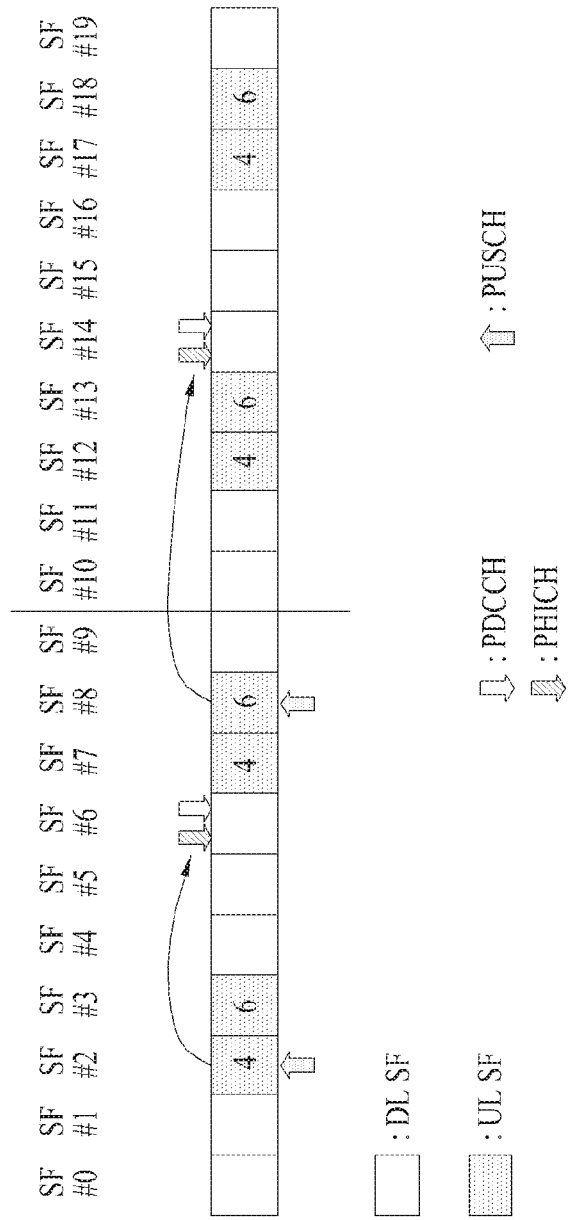

FIGS. 14 and 15 illustrate UL grant (UG)/PHICH timing. A PHICH is used to transmit DL ACK/NACK. Here, DL ACK/NACK means ACK/NACK transmitted on downlink as a response to UL data (e.g. PUSCH).

Referring to FIG. 14, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 10 shows a PHICH timing defined in the TDD. For PUSCH transmission in subframe #n, a UE determines a corresponding PHICH resource in subframe #(n+$k_{PHICH}$). In the FDD, $k_{PHICH}$=4.

TABLE 10

| TDD UL-DU Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | | | 4 | 7 | 6 | | | |
| 1 | | | | | 4 | 6 | | | 4 | 6 |
| 2 | | | 6 | | | | | | 6 | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

FIG. 15 illustrates UL grant/PHICH transmission timing when UL-DL configuration #1 is configured. In the figure, SF#0 to #9 and SF#10 to #19 respectively correspond to radio frames, and numerals in blocks denote DL subframes relating to UL subframes. For example, a UL grant/PHICH corresponding to a PUSCH of SF#2 is transmitted in SF#2+4 (=SF#6) and a UL grant/PHICH corresponding to a PUSCH of SF#8 is transmitted in SF#8+6 (=SF#14).

Figure 16:
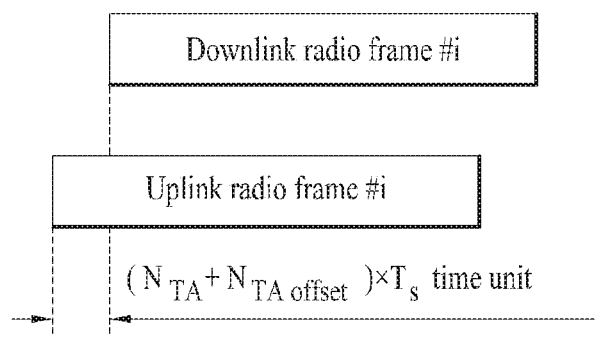
FIG. 16 illustrates an uplink-downlink frame timing relationship.

FIG. 16 illustrates an uplink-downlink frame timing relationship.

Referring to FIG. 16, transmission of uplink radio frame i is started $(N_{TA}+N_{TAoffset})*T_s$ seconds prior to transmission of a downlink radio frame corresponding thereto. In the LTE system, $N_{TA}$ is greater than 0 and less than 20512 ($0 \leq N_{TA} \leq 20512$). Moreover, in the FDD, $N_{TAoffset}$ is set to 0 ($N_{TAoffset}$=0) and in the TDD, $N_{TAoffset}$ is set to 624 ($N_{TAoffset}$=624). $N_{TAoffset}$ is a value previously informed between a BS and a UE. When $N_{TA}$ is indicated through a timing advance command during a random access procedure, the UE adjusts a transmission timing of a UL signal (e.g. PUCCH/PUSCH/SRS) through the above expression. The UL transmission timing is set to a multiple of 16 Ts. The timing advance command indicates a change in the UL timing with reference to the current UL timing. The timing advance command $T_A$ in the random access response is 11-bits. $T_A$ indicates a value between 0, 1, 2, ..., 1282 and the timing adjustment value $N_{TA}$ is given as $N_{TA}$=TA*16. In other cases, $T_A$ is 6-bits and indicates a value between 0, 1, 2, ..., 63. The timing adjustment value $N_{TA}$ is given as $N_{TA,new}=N_{TA,old}+(T_A-31)*16$. The timing advance command received in a subframe n is applied from a subframe (n+6). In the case of FDD, a transmission timing of a UL subframe n is advanced with reference to the start point of a DL subframe n as shown in the drawing. In the case of TDD, a transmission timing of a UL subframe n is advanced with reference to the end point of a DL subframe (n+1) (not shown in the drawing).

Figure 17:
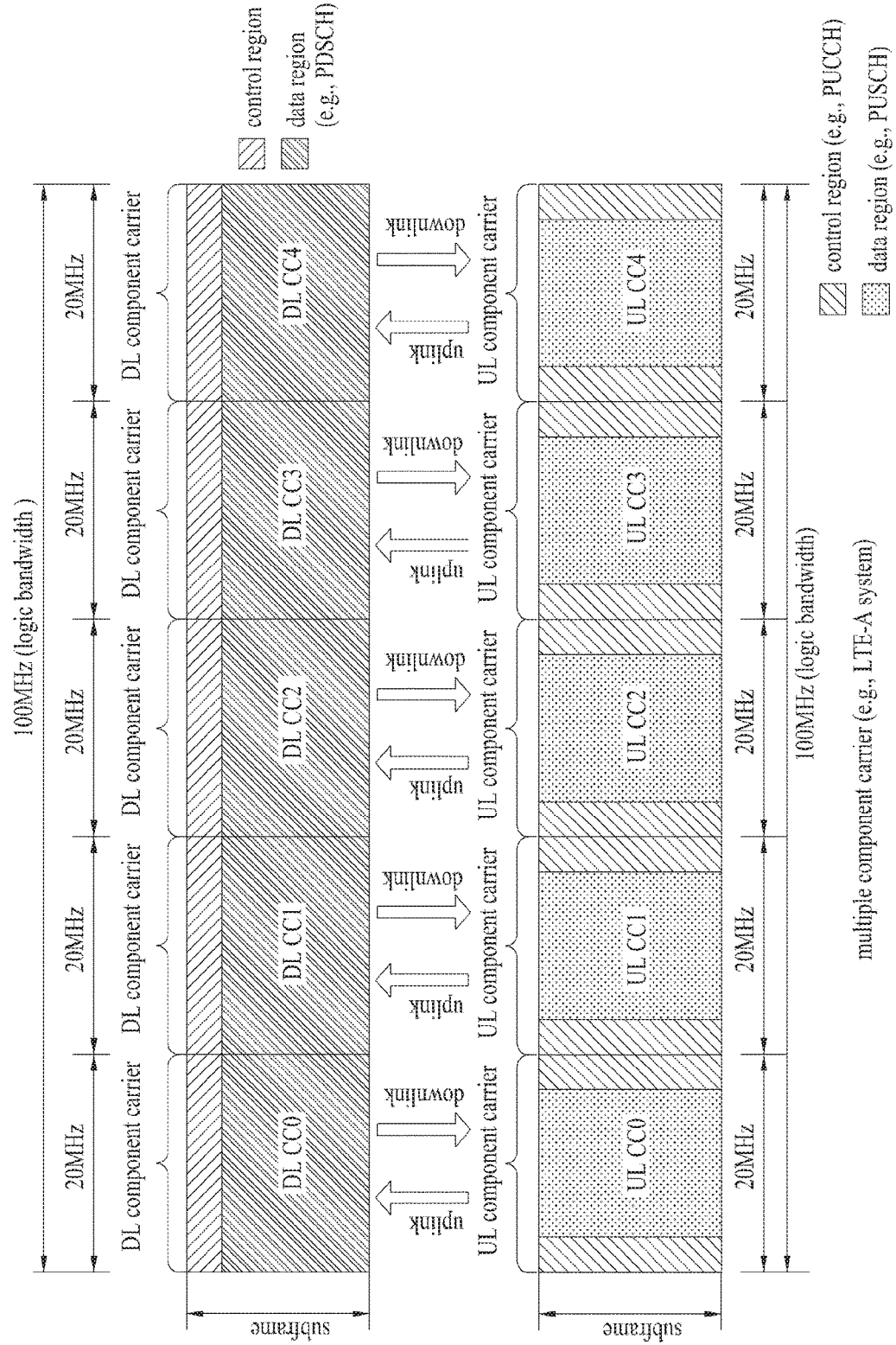
FIG. 17 illustrates a carrier aggregation (CA)-based wireless communication system.

FIG. 17 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 17, a plurality of UL/DL CCs can be aggregated to support a wider UL/DL bandwidth. The CCs may be contiguous or non-contiguous in the frequency domain. Bandwidths of the CCs can be independently determined Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be configured cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of DL resources and UL resources. Yet, the UL resources are not mandatory. Therefore, a cell may be composed of DL resources only or both DL resources and UL resources. The linkage between the carrier frequencies (or DL CCs) of DL resources and the carrier frequencies (or UL CCs) of UL resources may be indicated by system information when CA is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and one or more SCells, for a UE in an RRC_CONNECTED state, for which CA is set.

When a plurality of CCs is configured, cross-CC scheduling and non-cross-CC scheduling may be used. Non-cross-CC scheduling corresponds to scheduling in LTE. When cross-CC scheduling is applied, a DL grant PDCCH may be transmitted on DL CC#0 and a PDSCH corresponding thereto may be transmitted on DL CC#2. Similarly, a UL grant PDCCH may be transmitted on DL CC#0 and a PUSCH corresponding thereto may be transmitted on DL CC#4. For cross-CC scheduling, a carrier indicator field (CIF) is used. Presence or absence of a CIF in a PDCCH may be semi-statically and UE-specifically (or UE-group-specifically) configured through higher layer signaling (e.g. RRC signaling).

Scheduling according to the CIF may be arranged as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS may allocate a monitoring DL CC to reduce blind detection complexity of the UE. For PDSCH/PUSCH scheduling, the UE may detect/decode a PDCCH only on the corresponding DL CCs. In addition, the BS may transmit a PDCCH only through the monitoring DL CC (set). The monitoring DL CC set may be UE-specifically, UE-group-specifically or cell-specifically configured.

Figure 18:
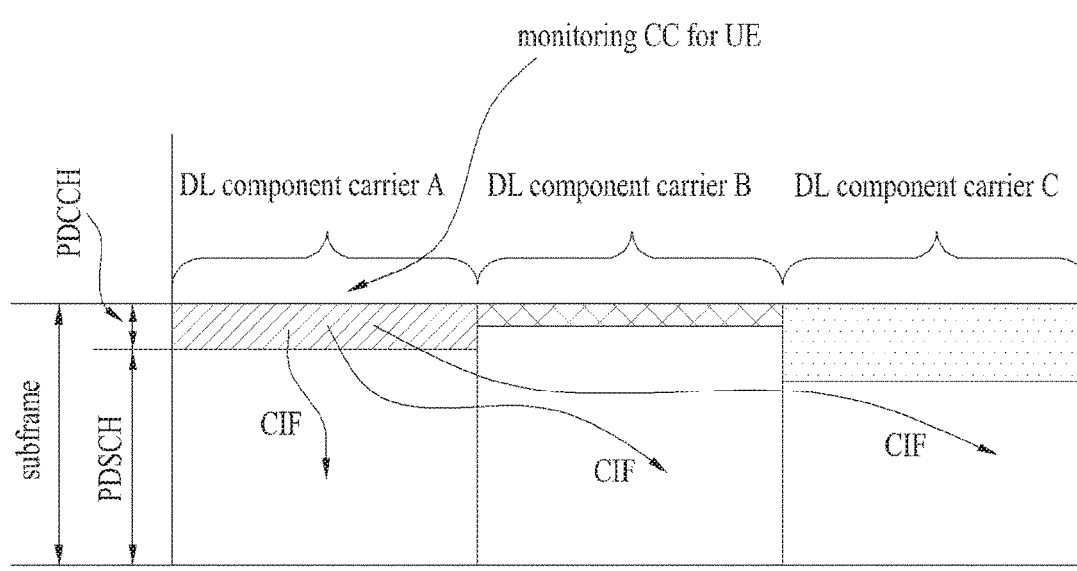
FIG. 18 illustrates a scheduling method when a plurality of cells is configured.

FIG. 18 illustrates cross-carrier scheduling. While the figure shows DL scheduling, cross-carrier scheduling is equally applied to UL scheduling.

Referring to FIG. 18, 3 DL CCs are configured for a UE, and DL CC A may be set as a PDCCH monitoring DL CC. When the CIF is disabled, each DL CC can transmit only a PDCCH that schedules a PDSCH corresponding to the DL CC without a CIF according to LTE PDCCH rule. When the CIF is enabled, DL CC A (i.e. MCC) can transmit not only a PDCCH that schedules the PDSCH corresponding to the DL CC A but also PDCCHs that schedule PDSCHs of other DL CCs using the CIF. In this case, a PDCCH is not transmitted in DL CC B/C.

Here, a specific CC (or cell) used to transmit scheduling information (e.g. PDCCH) is referred to as "monitoring CC (MCC)" which may be replaced by "monitoring carrier", "monitoring cell", "scheduling carrier", "scheduling cell", "scheduling CC", etc. A DL CC on which a PDSCH corresponding to a PDCCH is transmitted and a UL CC on which a PUSCH corresponding to a PUCCH is transmitted may be referred to as a scheduled carrier, a scheduled CC, a scheduled cell, etc. One or more scheduling CCs may be configured per UE. A scheduling CC may include a PCC. When only one scheduling CC is configured, the scheduling CC may be the PCC. The scheduling CC may be UE-specifically, UE-group-specifically or cell-specifically set.

In case of cross-CC scheduling, signal transmission may be performed as follows.

PDCCH (UL/DL grant): scheduling CC (or MCC)

PDSCH/PUSCH: CC indicated by a CIF of a PDCCH detected from a scheduling CC

DL ACK/NACK (e.g. PHICH): scheduling CC (or MCC) (e.g. DL PCC)

UL ACK/NACK (e.g. PUCCH): UL PCC

In the following description, DL ACK/NACK may be referred to as DL A/N or PHICH and UL ACK/NACK may be referred to as UL A/N or A/N for convenience.

In case of a TDD-configured cell, the following problem may occur when a UE transmits an ACK/NACK signal to a BS. Particularly, when the UE has missed a part of PDCCH(s) transmitted by the BS in a period of a plurality of subframes, the UE does not even know that a PDSCH corresponding to the missed PDCCH was transmitted to the UE, whereby an error may occur in generating ACK/NACK.

To solve the above problem, a DL grant PDCCH/SPS release PDCCH for a TDD CC includes a DAI field (i.e., DL DAI field). The value of the DL DAI field indicates a cumulative value (i.e., counting value) of PDCCH(s) corresponding to PDSCH(s) and PDCCH(s) indicating downlink SPS release to the current subframe within DL subframe(s) n-k (where k∈K). For example, if three DL subframes correspond to one UL subframe, PDSCHs transmitted in a period of the three DL subframes are sequentially indexed (i.e., sequentially counted) and the index (or count) is transmitted on a PDCCH for scheduling the PDSCHs. By checking DAI information of the PDCCH, the UE may determine whether a previous PDCCH is appropriately received.

Figure 19:
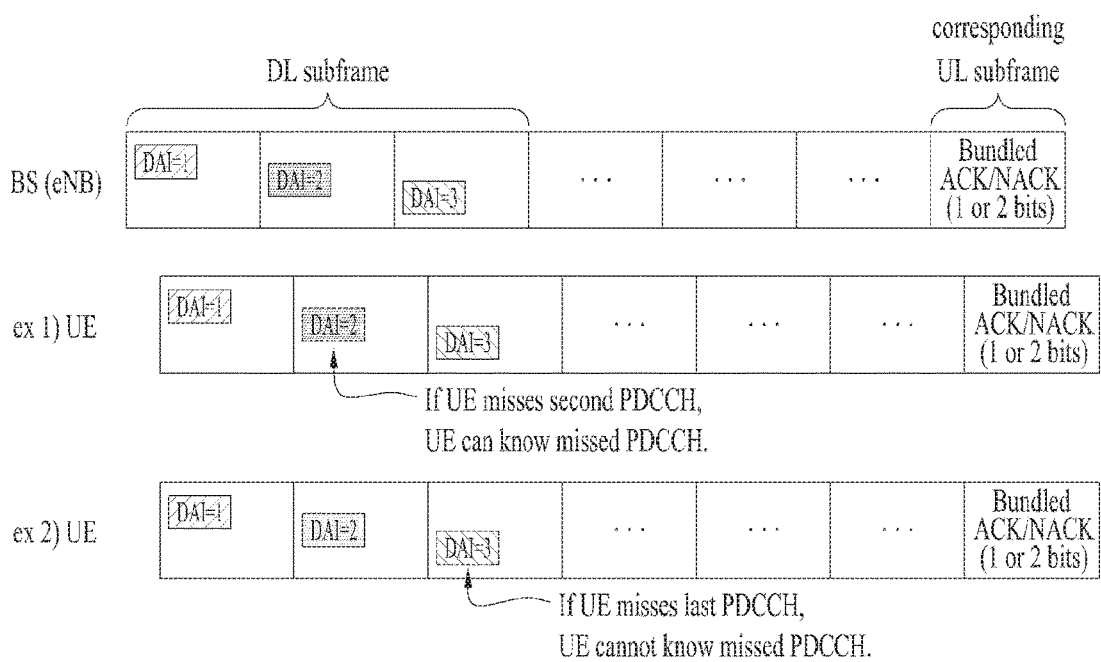
FIG. 19 illustrates ACK/NACK transmission using a DL DAI (Downlink Assignment Index)

FIG. 19 illustrates ACK/NACK transmission using a DL DAI. This example assumes a TDD system configured with 3 DL subframes:1 UL subframe. It is assumed for convenience that a UE transmits ACK/NACK using PUSCH resources. In the LTE, when ACK/NACK is transmitted on a PUSCH, 1-bit or 2-bit bundled ACK/NACK is transmitted.

Referring to FIG. 19, if a second PDCCH is missed as shown in a first example (example 1), since a DL DAI value of a third PDCCH is different from the number of detected PDCCHs, the UE may know that the second PDCCH is missed. In this case, the UE may process an ACK/NACK response to the second PDCCH as NACK (or NACK/DTX). On the other hand, if a last PDCCH is missed as shown in a second example (example 2), since a DAI value of the lastly detected PDCCH is equal to the number of detected PDCCHs, the UE cannot know that the last PDCCH is missed (i.e., DTX). Accordingly, the UE recognizes that only two PDCCHs are scheduled during a DL subframe period. In this case, since the UE bundles ACK/NACK corresponding to the first two PDCCHs, an error occurs in an ACK/NACK feedback procedure. To solve this problem, a UL grant PDCCH also includes a DAI field (i.e., UL DAI field). The UL DAI field is a 2-bit field and it includes information on the number of scheduled PDCCHs.

Table 11 shows values ($V^{DL}_{DAI}$, $V^{UL}_{DAI}$) indicated by a DAI field in a DCI format. $V^{DL}_{DAI}$ denotes a DL DAI value, and $V^{UL}_{DAI}$ denotes a UL DAI value. $V^{DL}_{DAI}$ denotes the value of DAI field in DCI format 1/1A/1B/1D/2/2A/2B/2C/2D in the case of UL-DL configurations #1 to #6. $V^{DL}_{DAI}$ denotes the value of DAI field in DCI format 0/4 (i) if one CC (or cell) having UL-DL configurations #1 to #6 is configured, or (ii) if a UE is configured not to use PUCCH format 3.

TABLE 11

| DAI MSB, LSB | $V_{DAI}^{UL}$ or $V_{DAI}^{DL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

MSB: Most significant bit. LSB: Least significant bit.

Table 12 shows a value ($W^{UL}_{DAI}$) indicated by a DAI field in DCI format 0/4. $W^{UL}_{DAI}$ denotes the value of DAI field in DCI format 0/4 (i) if a plurality of CCs (or cells) having UL-DL configurations #1 to #6 are configured, or (ii) if one CC (or cell) having UL-DL configurations #1 to #6 is configured and use of PUCCH format 3 is configured.

TABLE 12

| DAI MSB, LSB | $W_{DAI}^{DL}$ |
|---|---|
| 0, 0 | 1 |
| 0, 1 | 2 |
| 1, 0 | 3 |
| 1, 1 | 4 |

MSB: Most significant bit. LSB: Least significant bit.

For convenience, unless otherwise specified, DL DAI is referred to as V and UL DAI is referred to as W.

DAI is used in various ways in an ACK/NACK transmission procedure. For example, a DAI may be used in DTX detection as illustrated in FIG. 19, or used in an ACK/NACK payload generation procedure (e.g., determination of the size of ACK/NACK payload and the location of ACK/NACK information in the ACK/NACK payload) or ACK/NACK resource allocation procedure.

First of all, an example of DTX detection using a DAI will be described. when $V_{DAI}^{UL} \neq (U_{DAI}+N_{SPS}-1) \bmod 4+1$, a UE generates NACK for all codewords according to a bundling procedure based on the assumption that at least one DL assignment is missed (i.e., DTX occurs). $U_{DAI}$ denotes the total number of DL grant PDCCHs and SPS release PDCCHs detected in a subframe n-k (k∈K) (see Table 7). $N_{SPS}$ denotes the number of SPS PDSCHs (it is set to 0 or 1).

Second, an example of ACK/NACK payload generation using a DAI will be described. For convenience, assume a case in which PUCCH format 3 is configured. ACK/NACK payloads for PUCCH format 3 are configured per cell, and arranged in the order of cell indices. Specifically, HARQ-ACK feedback bits for a c-th serving cell (or DL CC) are given as $o_{c,0}^{ACK}, o_{c,1}^{ACK}, \ldots, o_{c,O_c^{ACK}-1}^{ACK}$ (where c≥0). $O^{ACK}_c$ denotes the number of bits (i.e., size) of HARQ-ACK payload of the c-th serving cell. Regarding the c-th serving cell, if a transmission mode for supporting transmission of a single transport block is configured or space bundling is applied, it may be given as $O^{ACK}_c = B^{DL}_c$.

On the other hand, regarding the c-th serving cell, if a transmission mode for supporting transmission of a plurality of transport blocks (e.g., 2 transport blocks) is configured and space bundling is not applied, it may be given as $O^{ACK}_c = 2B^{DL}_c$. If the HARQ-ACK feedback bits are transmitted on a PUCCH or if the HARQ-ACK feedback bits are transmitted on a PUSCH but there is no W corresponding to the PUSCH (e.g., SPS-based PUSCH), it is given as $B^{DL}_c = M$. M denotes the number of elements in set K defined in Table 7. If the TDD UL-DL configuration is #1, #2, #3, #4, or #6 and the HARQ-ACK feedback bits are transmitted on a PUSCH, it is given as $B^{DL}_c = W^{UL}_{DAI}$. $W^{UL}_{DAI}$ denotes a value indicated by a UL DAI field in a UL grant PDCCH (Table 12), and is simply expressed as W. In the case of the TDD UL-DL configuration #5, it is given as $B^{DL}_c = W_{DAI}^{UL} + 4\lceil(U-W_{DAI}^{UL})/4\rceil$. Here, U denotes a maximum Uc value, and Uc denotes the total number of PDSCH(s) received in a subframe n-k in the c-th serving cell and PDCCHs indicating (downlink) SPS release. A subframe n is a subframe for transmitting the HARQ-ACK feedback bits. ⌈ ⌉ represents a ceiling function.

Regarding the c-th serving cell, if a transmission mode for supporting transmission of a single transport block is configured or if space bundling is applied, the location of each ACK/NACK in HARQ-ACK payload of the corresponding serving cell is given as $O_{c,DAI(k)-1}^{ACK}$. DAI(k) represents a DL DAI value of a PDCCH detected in a DL subframe n-k. On the other hand, regarding the c-th serving cell, if a transmission mode for supporting transmission of a plurality of (e.g., 2) transport blocks is configured and space bundling is not applied, the location of each ACK/NACK in HARQ-ACK payload of the serving cell is given as $O_{c,2DAI(k)-2}^{ACK}$ and $O_{c,2DAI(k)-1}^{ACK}$. $O_{c,2DAI(k)-2}^{ACK}$ represents HARQ-ACK for codeword 0, and $O_{c,2DAI(k)-1}^{ACK}$ represents HARQ-ACK for codeword 1. Codeword 0 and codeword 1 may respectively correspond to transport block 0 and transport block 1, or transport block 1 and transport block 0 according to swapping. If PUCCH format 3 is transmitted in a subframe configured for SR transmission, PUCCH format 3 transmits ACK/NACK bits and a 1-bit SR together.

Hereinafter, a method of determining an ACK/NACK transmission resource in case of L-PDCCH based scheduling will be described. When PUCCH format 1a/1b (hereinafter referred to as PF1) is configured for A/N transmission, an ACK/NACK transmission resource for DL data scheduled by a DL grant L-PDCCH can be determined as a PUCCH resource linked to a specific ECCE index (e.g., minimum ECCE index) constituting the DL grant L-PDCCH (implicit PUCCH resource). Specifically, in the LTE/LTE-A, a PF1 resource index is determined as follows.

$$n^{(1)}_{PUCCH} = n_{CCE} + N^{(1)}_{PUCCH} \quad \text{[Equation 3]}$$

Where, $n^{(1)}_{PUCCH}$ indicates a resource index of PF1 for ACK/NACK/DTX transmission, $N^{(1)}_{PUCCH}$ indicates a signaling value received from a higher layer (e.g., radio resource control (RRC)), and $n_{CCE}$ indicates a smallest value among CCE indices used for L-PDCCH transmission. CS (cyclic shift), OC (orthogonal code) and PRB (physical resource block) for PF1 are obtained from $n^{(1)}_{PUCCH}$.

When PUCCH format 3 (hereinafter abbreviated as PF3) is configured for A/N transmission, a specific PF3 resource index among a plurality of PF3 resource indices ($n^{(3)}_{PUCCH}$) allocated by a higher layer (e.g., RRC) can be indicated by an ARI (ACK/NACK resource indicator) value of the DL grant L-PDCCH (explicit PUCCH resource). The ARI is transmitted through a TPC field of an L-PDCCH that schedules a PDSCH of an SCell. OC and PRB for PF3 are obtained from $n^{(3)}_{PUCCH}$.

Even in case of EPDCCH based scheduling, an ACK/NACK transmission resource for DL data scheduled by a DL grant EPDCCH can be determined as a PUCCH resource linked to a specific ECCE index (e.g., minimum ECCE index) constituting the DL grant EPDCCH or a PUCCH resource linked to an ECCE index obtained by adding a specific offset value to the specific ECCE index. In addition, an ACK/NACK feedback transmission resource can also be determined as the PUCCH resource linked to the specific ECCE index (e.g., minimum ECCE index) constituting the DL grant EPDCCH or the PUCCH resource linked to the ECCE index obtained by adding the specific offset value to the specific ECCE index. Here, the specific offset value can be determined by a value, which is directly signaled through an ARO (ACK/NACK resource offset) field in the DL grant EPDCCH and/or a value designated per AP (antenna port). Specifically, information signaled through the TPC field and the ARO field in the DL grant EPDCCH according to the frame structure type (e.g., FDD or TDD) and the A/N feedback transmission scheme (e.g., PF3 or CHsel) can be configured as follows. For convenience, a TPC command for PUCCH power control is defined as "TPC value", an offset value added when an implicit PUCCH index is determined is defined as "ARO value", and an ARI indicating a specific one of a plurality of PF3 indices or a plurality of PF1 indices (groups) allocated through RRC is defined as "ARI value". In addition, a fixed value (e.g., "0") that is inserted (for virtual CRC or the like) without containing no information is defined as "fixed value".

1) FDD with PF3
  A. TPC field
    i. DL grant for scheduling PCell: TPC value
    ii. DL grant for scheduling SCell: ARI value
  B. ARO field
    i. DL grant for scheduling PCell: ARO value
    ii. DL grant for scheduling SCell: Fixed value
2) FDD with CHsel
  A. TPC field
    i. DL grant for scheduling PCell: TPC value
    ii. DL grant for scheduling SCell: ARI value
  B. ARO field
    i. DL grant transmitted through PCell: ARO value
    ii. DL grant transmitted through SCell: Fixed value
3) TDD with PF3
  A. TPC field
    i. DL grant for scheduling PCell: TPC value
    ii. DL grant for scheduling SCell: ARI value
  B. ARO field
    i. DL grant, which corresponds to DAI=1, for scheduling PCell: ARO value
    ii. DL grant, which does not correspond to DAI=1, for scheduling PCell: ARI value
    iii. DL grant for scheduling SCell: Fixed value
4) TDD with CHsel
  A. TPC field
    i. DL grant for scheduling PCell: TPC value
    ii. DL grant for scheduling SCell: ARI value
  B. ARO field
    i. DL grant transmitted through PCell: ARO value
    ii. DL grant transmitted through SCell: Fixed value Meanwhile, not only aggregation of a plurality of CCs with the same SF configuration but also aggregation of a plurality of CCs with different SF configurations can be implemented. For instance, the aggregation of a plurality of CCs with different SF configurations includes aggregation of a plurality of CCs configured with different UL-DL configurations (for convenience, referred to as different TDD CA) and aggregation of TDD CCs and FDD CCs.

Moreover, even in the case of the aggregation of a plurality of CCs with different SF configurations, cross-CC scheduling can be supported. In this case, a UL grant/PHICH timing configured in an MCC may be different from that configured in an SCC (See FIGS. 12 and 13). To transmit a UG/PHICH for UL data transmitted through an SCC UL SF, which is cross-CC-scheduled with an MCC UL SF and the MCC, the same UG/PHICH timing or different UG/PHICH timings (configured in a specific UL-DL configuration) may be applied per CC. Alternatively, the UG/PHICH timings configured in the specific UL-DL configuration may be commonly applied to all CCs (i.e. PCC (or MCC) and SCC). In addition, the specific UL-DL configuration (hereinafter referred to as a reference configuration (Ref-Cfg)) may be identical to a UL-DL configuration configured in the PCC (or MCC) (i.e., MCC-Cfg) or a UL-DL configuration configured in the SCC (i.e., SCC-Cfg). Alternatively, the reference configuration may be determined as a UL-DL configuration other than MCC-Cfg and SCC-Cfg. Here, a UG or PHICH timing may mean 'D' capable of transmitting/receiving a UG for scheduling UL data of a specific 'U' and a PHICH for transmitting the corresponding UL data. Alternatively, the UG or PHICH timing may mean a timing relationship therebetween. Specifically, the application of a UL grant or PHICH timing configured in a specific CC (i.e., Ref-CC) or a specific UD-Cfg (i.e., Ref-Cfg) may mean the use of a parameter value corresponding to a UD-Cfg of the specific CC or the specific UD-Cfg shown in Tables 9 and 10.

Meanwhile, in case that a PDCCH/PDSCH-to-ACK/NACK timing (e.g., 4 ms) of the existing FDD cell is applied to a PDSCH of an FDD cell in TDD PCell-FDD SCell CA with any changes, if a TDD PCell is defined as a DL SF at an ACK/NACK transmission timing, ACK/NACK cannot be transmitted. Thus, it is possible to apply a new DL HARQ timing instead of the PDCCH/PDSCH-to-ACK/NACK timing defined in the existing FDD cell. Similarly, in case of a UL HARQ timing, a new HARQ timing can be applied. The currently available HARQ timings are as follows.

1) DL HARQ timing (PDSCH to HARQ-ACK timing) for TDD SCell in case of FDD PCell
  A. Self-scheduling case: follow DL HARQ timing of FDD PCell
  B. Cross-carrier scheduling case: follow DL HARQ timing of FDD PCell
2) UL HARQ timing (UL grant DCI to PUSCH, PUSCH to PHICH) for TDD SCell in case of FDD PCell
  A. Self-scheduling case: follow UL HARQ timing of TDD scheduled cell timing
  B. Cross-carrier scheduling case
    i. Option UL-A1:
      1. For FDD scheduling case, follow TDD scheduled cell timing
      2. For TDD scheduling cell case, reference U/D configuration for UL timing is derived by scheduling and scheduled cells U/D configuration following Rel-11 LTE rule.
    ii. Option UL-B1
      1. For FDD scheduling cell case, 4 ms for UL grant to PUSCH, 6 ms for PUSCH to PHICH
      2. For TDD scheduling case, reference U/D configuration for UL timing is derived by scheduling and scheduled cells U/D configuration following Rel-11 LTE rule.
    3. DL HARQ timing (PDSCH to HARQ-ACK timing) for FDD SCell in case of TDD PCell
  A. Self-scheduling case
    i. Option 1: for each TDD PCell U/D configuration, follow TDD PCell timing+additional new timings for the DL subframes for which DL HARQ timing is not defined in TDD PCell timing (or new timings for each TDD PCell U/D configuration to address more DL subframes than defined in TDD PCell)
  ii. Option 2: Follow reference U/D configuration defined (or configured) for the FDD SCell. (Configurable) reference U/D configuration depends on the TDD PCell's U/D configuration. (new timing can be added to the reference U/D configuration to support more DL subframes with HARQ-ACK feedback)
B. Cross-carrier scheduling case: same options (option 1 and option 2) as in self-scheduling case, or else, only follow TDD PCell timing
4) UL HARQ timing (UL grant DCI to PUSCH, PUSCH to PHICH) for FDD SCell in case of TDD PCell
A. Self-scheduling case: follow FDD scheduled cell timing
B. Cross-carrier scheduling case
  i. Option UL-A2:
    1. For TDD scheduling cell case, follow scheduling cell timing
    2. For FDD scheduling cell case, follow FDD timing
  ii. Option UL-B2:
    1. For TDD scheduling cell case, 4 ms for UL grant to PUSCH, 6 ms for PUSCH to PHICH
    2. For FDD scheduling cell case, follow FDD timing Table 13 shows examples of HARQ timings (e.g., DASI) in accordance with the DL HARQ option 1. In Table 13, the HARQ timing indicates a type/index of the HARQ timing configured for the TDD PCell U/D configuration and indicates a DASI index newly generated for the TDD PCell U/D configuration. Tables 14 to 16 shows examples of reference U/D configurations which can be applied to the FDD SCell in the case of the DL HARQ options 2.

TABLE 15

| TDD PCell U/D cfg | Allowed reference configuration for FDD SCell |
|---|---|
| 0 | {2, 4, 5} |
| 1 | {2, 4, 5} |
| 2 | {2, 5} |
| 3 | {4, 5} |
| 4 | {4, 5} |
| 5 | {5} |
| 6 | {2, 4, 5} |

TABLE 16

| TDD PCell U/D cfg | Allowed reference configuration for FDD SCell (2 aggregated cells) | Allowed reference configuration for FDD SCell (more than 2 aggregated cells) |
|---|---|---|
| 0 | 5 | 2 |
| 1 | 5 | 2 |
| 2 | 5 | 2 |
| 3 | 5 | 4 |
| 4 | 5 | 4 |
| 5 | 5 | Not applicable |
| 6 | 5 | 2 |

Embodiment: Control Information Allocation/Transmission in Dynamic Subframe Reconfiguration In a system beyond the LTE, an operating scheme that reconfigures/changes a UL/DL SF direction has been considered for the purpose of eIMTA (enhanced interference mitigation and traffic adaptation) in the TDD. To this end, it is considered a scheme for (semi-)statically configuring a basic UL-DL configuration (i.e., UD-cfg) of a TDD cell (or CC) using higher layer signaling (e.g., SIB) and then dynamically reconfiguring/changing an operating UD-cfg of the corresponding cell (or CC) using lower layer (e.g., L1 (Layer1)) signaling (e.g., PDCCH). For convenience, the basic UD-cfg is referred to an SIB-cfg and the operating UD-cfg is referred to as an actual-cfg. The subframe configuration in accordance with the UD-cfg is determined based on Table 1. In addition, in the present invention, a DL SF, a UL SF and a special SF are referred to as D, U and S, respectively.

TABLE 13

| TDD PCell UL-DL Cfg | HARQ timing | subframe n 0 | 1 | 2 | 3 | 4 | 5 | 6 | 7 | 8 | 9 |
|---|---|---|---|---|---|---|---|---|---|---|---|
| 0 | 0A | — | — | 6, [5] | [5], [4] | 4 | — | — | 6, [5] | [5], [4] | 4 |
| 0 | 0B | — | — | 6, [5], [4] | | [5], 4 | — | — | 6, [5], [4] | | [5], 4 |
| 1 | 1 | — | — | 7, 6, [5] | [5], 4 | — | — | — | 7, 6, [5] | [5], 4 | — |
| 1 | 1* | — | — | 7, 6 | [6], [5], 4 | — | — | — | 7, 6 | [6], [5], 4 | — |
| 2 | 2 | — | — | 8, 7, 6, [5], 4 | — | — | — | — | 8, 7, 6, [5], 4 | — | — |
| 3 | 3 | — | — | 11, [10], [9], [8], 7, 6 | 6, 5 | 5, 4 | — | — | — | — | — |
| 3 | 3a | — | — | 11, [10], 7, 6 | [10], 6, 5 | [10], 5, 4 | | | | | |
| 4 | 4 | — | — | 12, 11, [10], [9], 8, 7 | 7, 6, 5, 4 | — | — | — | — | — | — |
| 4 | 4a | — | — | 12, 11, [10], 8, 7 | [10], 7, 6, 5, 4 | | | | | | |
| 5 | 5 | — | — | 13, 12, 11, [10], 9, 8, 7, 6, 5, 4 | — | — | — | — | — | — | — |
| 6 | 6 | — | — | [8], 7 | 7, [6] | [6], 5 | — | — | 7 | 7, [6], [5] | — |
| 6 | 6* | — | — | 7 | 7, [6], [5] | 5 | — | — | 7, [6], [5], [4] | 7 | — |

TABLE 14

| TDD PCell U/D cfg | Allowed reference configuration for FDD SCell |
|---|---|
| 0 | {0, 1, 2, 3, 4, 5, 6} |
| 1 | {1, 2, 4, 5} |
| 2 | {2, 5} |
| 3 | {3, 4, 5} |
| 4 | {4, 5} |
| 5 | {5} |
| 6 | {1, 2, 3, 4, 5, 6} |

Regarding the above-mentioned dynamic reconfiguration, a reconfiguration from D to U (or S) (i.e., D=>U (or S)) may be difficult to be achieved or cause degradation in consideration of DL reception/measurement, which is performed by the legacy UE in the corresponding D using a CRS. On the other hand, in case of a reconfiguration from U (or S) to D (i.e., U (or S)=>D), a BS does not intentionally schedule/configure a UL signal, which may be transmitted by the legacy UE through the corresponding U, whereby additional DL resources can be provided to an eIMTA UE.

In consideration of this fact, the actual-cfg can be selectively determined from UD-cfgs (including the SIB-cfg) including all Ds on the SIB-cfg. That is, although a UD-cfg having D arranged at every D position on the SIB-cfg can be determined as the actual-cfg, a UD-cfg having U arranged at a D position on the SIB-cfg cannot be determined as the actual-cfg. Meanwhile, in the eIMTA, a reference UD-cfg (hereinafter referred to as a D-ref-cfg) can be separately configured by a higher layer (signaling) in order to configure an HARQ timing (e.g., HARQ-ACK feedback transmission timing) for DL scheduling. Considering this, the actual-cfg can be selectively determined from UD-cfgs (including the D-ref-cfg) that include all Us on the D-ref-cfg. Therefore, a UD-cfg in which D is arranged at a U position on the D-ref-cfg cannot be determined as the actual-cfg.

Accordingly, the D-ref-cfg can be set to the UD-cfg including all of the Ds on available actual-cfg candidates and the SIB-cfg can be set to the UD-cfg including all of the Us on the available actual-cfg candidates. In other words, the D-ref-cfg can be set to the UD-cfg obtained from a superset of Ds on the available actual-cfg candidates and the SIB-cfg can be set to the UD-cfg obtained from a superset of Us on the available actual-cfg candidates. A reference UD-cfg (hereinafter referred to as U-ref-cfg) of an HARQ timing (e.g., UG/PUSCH/PHICH transmission timing) for UL scheduling can be set to the SIB-cfg. Thus, U on the D-ref-cfg can be considered as fixed U and D on the SIB-cfg can be considered as fixed D. Hence, only the SF, which simultaneously corresponds to D on the D-ref-cfg and U on the SIB-cfg, can be considered as flexible U that can be reconfigured/changed as U=>D. The flexible U can also be reconfigured/changed as U=>D in the actual-cfg.

In other words, after the SIB-cfg/D-ref-cfg is configured by the higher layer (signaling), one of the UD-cfg(s) containing all of the Ds on the SIB-cfg and all of the Us on the D-ref-cfg can be set to the actual-cfg by the L1 signaling.

On the other hand, the eIMTA can also be applied to the FDD system through a scheme of reconfiguring a certain UL SF on a UL carrier as a DL SF (and/or special SF) (hereinafter, referred to as FDD eIMTA). For instance, it may be considered a scheme of (dynamically) reconfiguring/changing a UL SF on a UL carrier according to the TDD UL-DL configuration.

Figures 20, 21:
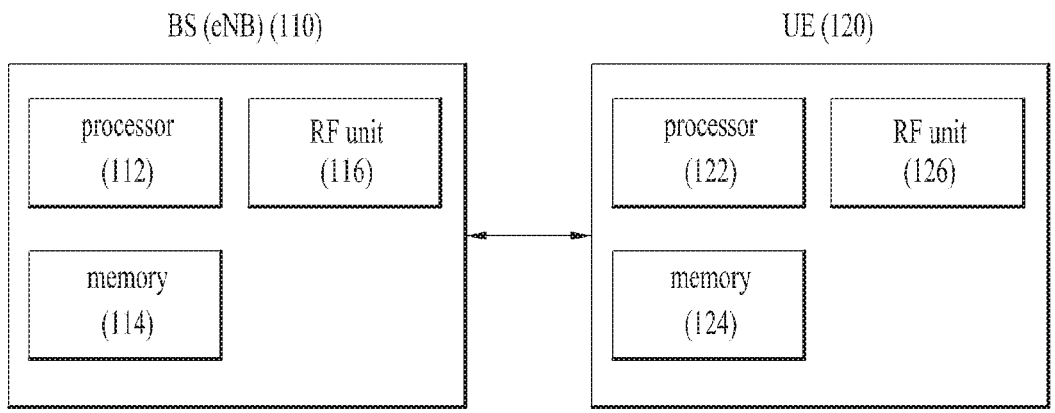
FIG. 20 illustrates an FDD eIMTA (Frequency Division Duplex enhanced Interference Mitigation and Traffic Adaptation) scheme based on a TDD UD-cfg (Time Division Duplex Uplink Downlink configuration)
FIG. 21 illustrates a base station and a user equipment applicable to an embodiment of the present invention.

FIG. 20 illustrates an FDD eIMTA scheme based on a TDD UD-cfg. Referring to FIG. 20, a UL resource in an FDD cell can be dynamically reconfigured using L1 signaling (e.g., PDCCH). It is assumed in the present example that an SF configuration of a UL CC is reconfigured according to UD-cfg#1. Thus, a PDSCH can be transmitted on the UL CC but a PUSCH/PUCCH cannot be transmitted on the UL CC. A UD-cfg (i.e., actual-cfg) for dynamically reconfiguring the SF on the UL CC can be signaled according to a predetermined period. For convenience, in the following description, a DL SF on a DL CC is referred to as D1 and a reconfigured SF (i.e., an SF reconfigured as an UL SF=>a DL SF or S SF) on a UL CC is referred to as D2.

Since the UL resource of the UL CC is dynamically changed in the FDD cell, a method of determining/defining an HARQ timing for scheduling a PDSCH transmitted on the DL/UL CC, an HARQ timing for scheduling a PUSCH transmitted on the UL CC, and an actual-cfg for the SF configuration on the UL CC may be required. Hereinafter, a method for configuring an HARQ timing and an HARQ-ACK transmission resource/feedback for the FDD eIMTA scheme is proposed. For convenience, although the present invention is described focusing on an FDD eIMTA scheme for reconfiguring/changing UL CC resources according to a UL/DL SF configuration corresponding to the TDD UD-cfg, the invention can be extensively applied to all FDD eIMTA schemes for reconfiguring/changing UL CC resources according to a random UL/DL SF configuration in a similar manner.

PDSCH HARQ Timing for UL CC (Hereinafter Referred to as D-ref-UC)

A DL HARQ timing for a PDSCH on a UL CC (hereinafter, referred to as a D-ref-UC) may be previously defined as one of specific TDD UD-cfgs in which relatively many DL resources are configured (e.g., UD-cfg 2/3/4/5) or it may be configured through higher layer (e.g., RRC) signaling. Thus, the DL HARQ timing depends on parameters (e.g., Table 7) defined for the D-ref-UC.

PDSCH HARQ Timing for DL CC (Hereinafter Referred to as D-ref-DC)

A DL HARQ timing for a PDSCH on a DL CC (hereinafter referred to as a D-ref-DC) may be configured identical to a DL HARQ timing of an FDD SCell when CA is performed between a TDD PCell having a UD-cfg identical to the D-ref-UC and the SCell (e.g., Tables 13 to 16) (Alt 1). Alternatively, the D-ref-DC may be previously defined as one of the specific TDD UD-cfgs in which relatively many DL resources are configured (e.g., UD-cfg 2/3/4/5) or it may be configured through higher layer (e.g., RRC) signaling (Alt 2).

PUSCH HARQ Timing for UL CC (Hereinafter Referred to as U-ref-UC)

A UL HARQ timing for a PUSCH on a UL CC (hereinafter referred to as a U-ref-UC) may be configured identical to a UL HARQ timing of an SCell in either FDD PCell-TDD SCell CA or TDD PCell-FDD SCell CA (e.g., 4 ms for UL grant to PUSCH or 6 ms for PUSCH to PHICH) (Alt 1). Alternatively, the U-ref-UC may be previously defined as one of specific TDD UD-cfgs in which relatively many UL resources are configured (e.g., UD-cfg 0/1/6) or it may be configured through higher layer (e.g., RRC) signaling (Alt 2). The Alt 1 may be applied to a case in which a UL CC is scheduled based on a DL CC and the Alt 2 may be applied to a case in which a UL CC is scheduled based on the corresponding UL CC.

Meanwhile, when a UL CC is not allowed to be scheduled from the corresponding UL CC (Case #1), no PHICH resource may be allocated to D reconfigured on the UL CC. On the contrary, when a UL CC is allowed to be scheduled from the corresponding UL CC (Case #2), i) a PHICH resource may be allocated to all Ds on an actual-cfg (or, U-ref-UC) (See Table 17) or ii) a PHICH resource configuration in each SF on a U-ref-UC (or actual-cfg) may be applied without any changes (See Table 18). In Tables below, "—" can be considered/applied as "0".

TABLE 17

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 1 | 1 | — | — | 1 | 1 | 1 | — | — | 1 |
| 2 | 1 | 1 | — | 1 | 1 | 1 | 1 | — | 1 | 1 |
| 3 | 1 | 1 | — | — | — | 1 | 1 | 1 | 1 | 1 |
| 4 | 1 | 1 | — | — | 1 | 1 | 1 | 1 | 1 | 1 |
| 5 | 1 | 1 | — | 1 | 1 | 1 | 1 | 1 | 1 | 1 |
| 6 | 1 | 1 | — | — | — | 1 | 1 | — | — | 1 |

TABLE 10

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

For PHICH (including a PDCCH and other control channels) resource allocation/mapping in the D reconfigured on the UL CC, i) separate PHICH-Config parameters which will be applied to a UL CC (e.g., PHICH-Duration (normal or extended) and/or PHICH-resource (⅙ or ½ or 1 or 2)) can be independently configured or ii) the PHICH-Config parameters which are applied to a DL CC can be used for a UL CC without any changes.

In addition, in the Case #1, a PCFICH and/or PDCCH may not be configured/transmitted in the D reconfigured on the UL CC, and thus PDSCH transmission in the corresponding D may be configured to start from a first symbol index (e.g., index #0). On the other hand, in the Case #2, a PCFICH and/or PDCCH may be configured/transmitted even in the D reconfigured on the UL CC.

Meanwhile, whether D and U on a UL CC are scheduled from a DL CC or the corresponding UL CC may be configured. On the other hand, D on a DL CC may be limited to be scheduled from the corresponding DL CC. As another method, the D and U on the UL CC may be scheduled from different CCs, respectively.

PUCCH Resource Allocation for HARQ-ACK Feedback

In terms of PUCCH resource allocation, D (in a DL CC and/or UL CC) of which an HARQ-ACK timing is linked to U (in a UL CC) on a D-ref-UC can be divided into three types such as 1) D1 with legacy timing, 2) D1 with non-legacy timing, and 3) D2 (with legacy timing and/or non-legacy timing) according to a combination of a D-ref-UC and the D-ref-DC. Here, the legacy timing represents a timing offset (e.g., 4 ms or 4 SFs) relationship between PDCCH/PDSCH transmission on a DL CC and relevant HARQ-ACK transmission on a UL CC in the conventional FDD system.

According to the types of D, the following PUCCH resource allocation methods can be considered.

Method 1) PUCCH Resource Allocation by Implicit Resource Stacking

PUCCH resources linked to the D1 with non-legacy timing and the D2 can be implicitly stacked from the conventional (FDD) implicit PUCCH resource region linked to the D1 with legacy timing. In other words, implicit PUCCH resources linked to D can be stacked from the outside to the inside of a UL CC frequency band in order of the D1 with legacy timing=>the D1 with non-legacy timing/D2. For instance, if the last (conventional) implicit PUCCH resource index linked to the D1 with legacy timing is defined as N_last, a PUCCH index obtained by adding the PUCCH index, which is linked to a CCE index configured in the D1 with non-legacy timing and D2, to the N_last may be determined as the final implicit PUCCH resource linked to the D1 with non-legacy timing and D2. In this case, the conventional implicit PUCCH resource region (e.g., N_last) linked to the D1 with legacy timing may be configured on the assumption of a maximum CFI value (or the number of maximum CCE resources) that can be configured in the corresponding D1. In addition, the conventional implicit PUCCH resource index is determined according to Equation 3.

Method 2) PUCCH Resource Allocation with PUCCH Starting Offset

In the case of the D1 with legacy timing, the conventional implicit PUCCH resource linked to the corresponding D is allocated as it is. On the other hand, in the case of the D1 with non-legacy timing and D2, the final implicit PUCCH resource linked to the D1 with non-legacy timing and D2 can be determined/allocated by applying a PUCCH resource starting offset to the PUCCH index linked to the CCE index in the corresponding D.

Specifically, if the PUCCH resource starting offset is defined as N_pucch, a PUCCH index obtained by adding the PUCCH index linked to the CCE index configured in the D1 with non-legacy timing and D2 to the N_pucch may be determined/allocated as the final implicit PUCCH resource linked to the corresponding D1 with non-legacy timing and D2. The N_pucch value may be configured UE-commonly or UE-specifically through higher layer (e.g., RRC) signaling. In addition, one common N_pucch value may be configured for both of the D1 with non-legacy timing and the D2 or a different N_pucch value may be configured for each of the D1 with non-legacy timing and the D2.

Moreover, in the case of D1 with non-legacy timing, the Method 1 may be applied and in the case of D2, the Method 2 may be applied.

With respect to the Method 1 and Method 2, the following can be considered for stacking PUCCH resources linked to the D1 with non-legacy timing and D2.

Alt 1: PUCCH resources linked to the D1 with non-legacy timing are stacked and then PUCCH resources linked to the D2 are stacked (that is, implicit PUCCH resources are stacked from the outside to the inside of the UL CC frequency band in order of D1 with non-legacy timing=>D2).

Alt 2: PUCCH resources linked to D are stacked according to an SF priority or an SF priority on DASI of a D-ref-DC/D-ref-UC (that is, PUCCH resources are sequentially stacked from D with high SF priority from the outside of the inside of the UL CC frequency band). In a single SF, PUCCH resource may be stacked in order of D1 with non-legacy timing=>D2.

Method 3) PUCCH Resource Allocation with Explicit RRC Resource

In the case of the D1 with legacy timing and D1 with non-legacy timing, the (implicit) PUCCH resources can be allocated by applying the Method 1 or Method 2. In the case of the D2, explicit PUCCH resource configured through higher layer (e.g., RRC) signaling can be allocated.

For instance, after pre-configuring a plurality of PUCCH resources (set) through the higher layer (e.g., RRC) signaling, which one of the plurality of the PUCCH resources (set) is finally allocated/used for HARQ-ACK transmission corresponding to the D2 may be indicated through L1 signaling. Specifically, the final PUCCH resource may be indicated through specific DG DCI (e.g., DG DCI for scheduling the D2). To this end, a new filed may be added to DCI or an existing specific field (e.g., TPC field) may be used/utilized for the purpose of indicating the PUCCH resource. In addition, the final PUCCH resource may be indicated based on a resource for DCI transmission (e.g., minimum/maximum CCE indices used in PDCCH transmission). Moreover, the final PUCCH resource may be indicated based on a resource allocated for PDSCH transmission scheduled from the DCI (e.g., minimum/maximum PRB indices used in the PDSCH transmission).

HARQ-ACK Feedback Composition with PF3 and CHsel

First of all, a description will be given of the conventional HARQ-ACK configuration/transmission method, which is applied to TDD-based CA. Here, the above HARQ-ACK configuration/transmission method includes the HARQ-ACK configuration/transmission method based on PUCCH format 3 (hereinafter referred to as PF 3) or PUCCH format 1b with channel selection (hereinafter referred to as CHsel)

1) PF3 for TDD
  A. TPC/ARI signaling
    i. DG PDCCH with DAI=1 for scheduling PCell: TPC for PUCCH transmit power control is signaled
    ii. DG PDCCH with DAI>1 for scheduling PCell or DG PDCCH for scheduling SCell: ARI indicating one of a plurality of PF3 resources is signaled.
  B. HARQ-ACK resource
    i. Reception of only PDCCH with DAI=1 for scheduling PCell: HARQ-ACK is transmitted using implicit PUCCH format 1a/1b resources linked to PDCCH
    ii. Reception of PDCCH with DAI>1 for scheduling PCell or PDCCH for scheduling SCell: HARQ-ACK is transmitted using PF3 resources indicated by ARI in PDCCH
  C. HARQ-ACK ordering
    i. HARQ-ACK bits on PF3 payload are configured between cells in order of PCell=>SCell and within cell in order of DAI value. For instance, an HARQ-ACK response corresponding to DAI=1 of PCell is arranged in MSB (most significant bit). Other HARQ-ACK responses are sequentially arranged in order of DAI=2 of PCell, . . . , DAI=1 of SCell, . . . .
2) CHsel for TDD
  A. TPC/ARI signaling
    i. With cross-CC scheduling
      1. DG PDCCH for scheduling PCell: TPC for PUCCH transmit power control is signaled
      2. DG PDCCH for scheduling SCell: Both TPC/ARI is not signaled (UE does not refer to TPC field)
    ii. Without cross-CC scheduling
      1. DG PDCCH for scheduling PCell: TPC for PUCCH transmit power control is signaled
      2. DG PDCCH for scheduling SCell: ARI indicating one of a plurality of explicit PF1 resources (set) allocated by RRC is signaled
  B. HARQ-ACK resource
    i. With cross-CC scheduling
      1. PUCCH resource corresponding to PCell: Implicit PF1 resource linked to PDCCH with DAI=½ for scheduling PCell
      2. PUCCH resource corresponding to SCell: Implicit PF1 resource linked to PDCCH with DAI=½ for scheduling SCell
    ii. Without cross-CC scheduling
      1. PUCCH resource corresponding to PCell: Implicit PF1 resource linked to PDCCH with DAI=½ for scheduling PCell
      2. PUCCH resource corresponding to SCell: Explicit PF1 resource (set) indicated by ARI in PDCCH for scheduling SCell
  C. HARQ-ACK ordering
    i. HARQ-ACK responses corresponding to DAI=1, 2, 3 and 4 of PCell are sequentially mapped to HARQ-ACK (0), (1), (2), and (3) corresponding to the PCell and HARQ-ACK responses corresponding to DAI=1, 2, 3 and 4 of SCell are sequentially mapped to HARQ-ACK (0), (1), (2), and (3) corresponding to SCell on an A/N state-to-PUCCH resource mapping table for CHsel.

The HARQ-ACK configuration/transmission method, which is applied to PCell-SCell TDD CA, can be (modified and) applied to the FDD eIMTA in a similar manner by considering the DL CC and UL CC as the PCell and Scell, respectively. Specifically, the HARQ-ACK configuration/transmission procedure (e.g., TPC/ARI signaling, HARQ-ACK resource allocation, HARQ-ACK ordering, etc.) for the FDD eIMTA can be performed by replacing/considering the PCell and Scell with/as the above-mentioned D1 and D2, respectively. Here, "with cross-CC scheduling" may be applied to a case in which the PUCCH resources are allocated based on the Method 1 or Method 2 or a case in which the D2 is configured to be scheduled from the D1 when the PUCCH resources are allocated based on the Method 3. In addition, "without cross-CC scheduling" may be applied to a case in which the D2 is configured to be scheduled from the corresponding D2 when the PUCCH resources are allocated based on the Method 3.

Meanwhile, in the case of the PF3, when only one PDCCH, which corresponds to a CSS DG DCI format, for scheduling the PCell is received, HARQ-ACK transmission can be performed using the implicit PUCCH format 1a/1b resources linked to the corresponding PDCCH. In other cases (e.g., a case in which a USS DG DCI format is received, and a case in which a plurality of PDCCHs are received), a UE may perform the HARQ-ACK transmission using the explicitly indicated PF3 resources. Moreover, in the case of the PDCCH, which corresponds to a DL grant DCI format configured in CSS, for scheduling the PCell, a TPC for PUCCH transmit power control may be signaled through the corresponding PDCCH.

Additionally, (from the viewpoint of a UE), CSS-based scheduling can be limited to be performed only once within a TDD bundling window corresponding to one HARQ-ACK transmission timing and/or the CSS-based scheduling can be executed based on the assumption that it is performed through only the D1 with legacy timing. For example, a UE may monitor CSS and USS in the D1 with legacy timing and only the USS in other DL SFs.

Further, in case that the PF3 is configured, if CSS-based PCell (=D1=DL CC) scheduling, PCell (=D1=DL CC) scheduling based on DAI=1, and/or SPS-based scheduling that does not accompany PDCCH transmission are simultaneously received, HARQ-ACK feedback with respect to the corresponding scheduling can be configured/transmitted by applying the CHsel scheme based on (a plurality of) PUCCH format 1a/1b resources linked/allocated to each scheduling.

FIG. 21 illustrates a BS and a UE of a wireless communication system, which are applicable to embodiments of the present invention. When the wireless communication system includes a relay, the BS or UE can be replaced by the relay.

Referring to FIG. 21, the wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, BS or other apparatuses (e.g. a relay) of a wireless communication apparatus. Specifically, the present invention is applicable to a method for transmitting control information and an apparatus for the same.

What is claimed is:

1. A method of transmitting control information through a Frequency Division Duplex (FDD) cell containing a UL (Uplink) CC (Component Carrier) and a DL (Downlink) CC by a UE (User Equipment) in a wireless communication system, the method comprising:
receiving subframe reconfiguration information for the UL CC;
receiving a PDCCH (Physical Downlink Control Channel) containing DCI (Downlink Control Information) on the FDD cell;
receiving a PDSCH (Physical Downlink Shared Channel) indicated by the PDCCH on the FDD cell; and
transmitting HARQ-ACK (Hybrid Automatic Repeat reQuest Acknowledgement) information for the PDSCH in a subframe # n on the UL CC,
wherein an index of a PUCCH (Physical Uplink Control Channel) resource used for transmitting the HARQ-ACK information is determined as follows:
$n^{(1)}_{PUCCH} = n_{CCE} + N^{(1)}_{PUCCH}$ when the PDSCH is received in a subframe #(n−4) on the DL CC,
$n^{(1)}_{PUCCH} = n_{CCE} + N^{(1)}_{PUCCH} +$ a first offset, when the PDSCH is received in a subframe other than the subframe #_(n−4) on the DL CC, and
$n^{(1)}_{PUCCH} = n_{CCE} + N^{(1)}_{PUCCH} +$ a second offset, when the PDSCH is received in a subframe of the UL CC, which is reconfigured as a DL subframe according to the subframe reconfiguration information, and
wherein the $n_{CCE}$ corresponds to an index of a CCE (Control Channel Element) constituting the PDCCH, the $N^{(1)}_{PUCCH}$ is a constant configured by an RRC (Radio Resource Control) layer, the first offset is a positive integer and is determined using a maximum number of CCEs that can be used for PDCCH transmissions in the subframe # (n−4) of the DL CC, and the second offset is a positive integer and is UE-specifically configured through RRC layer signaling.

2. The method of claim 1, wherein the $n_{CCE}$ represents an index of a first CCE of a plurality of CCEs constituting the PDCCH.

3. A UE (User Equipment) configured to transmit control information through a Frequency Division Duplex (FDD) cell containing a UL (Uplink) CC (Component Carrier) and a DL (Downlink) CC in a wireless communication system, the UE comprising:

an RF (Radio Frequency) unit; and
a processor,
wherein the processor is configured to receive subframe reconfiguration information for the UL CC, receive a PDCCH (Physical Downlink Control Channel) containing DCI (Downlink Control Information) on the FDD cell, receive a PDSCH (Physical Downlink Shared Channel) indicated by the PDCCH on the FDD cell, and transmit HARQ-ACK (Hybrid Automatic Repeat reQuest Acknowledgement) information for the PDSCH in a subframe # n on the UL CC, and
wherein an index of a PUCCH (Physical Uplink Control Channel) resource used for transmitting the HARQ-ACID information is determined as follows:

$n^{(1)}_{PUCCH} = n_{CCE} + N^{(1)}_{PUCCH}$ when the PDSCH is received in a subframe #(n−4) on the DL CC, $n^{(1)}_{PUCCH} = n_{CCE} + N^{(1)}_{PUCCH} +$ a first offset, when the PDSCH is received in a subframe other than the subframe #_(n−4) on the DL CC, and $n^{(1)}_{PUCCH} = n_{CCE} + N^{(1)}_{PUCCH} +$ a second offset, when the PDSCH is received in a subframe of the UL CC, which is reconfigured as a DL subframe according to the subframe reconfiguration information, and wherein the $n_{CCE}$ corresponds to an index of a CCE (Control Channel Element) constituting the PDCCH, the $N^{(1)}_{PUCCH}$ is a constant configured by an RRC (Radio Resource Control) layer, the first offset is a positive integer and is determined using a maximum number of CCEs that can be used for PDCCH transmissions in the subframe # (n−4) of the DL CC, and the second offset is a positive integer and is UE-specifically configured through RRC layer signaling.

4. The user equipment of claim 3, wherein the $n_{CCE}$ represents an index of a first CCE of a plurality of CCEs constituting the PDCCH.

* * * * *